US012237902B2

(12) United States Patent
Wang et al.

(10) Patent No.: US 12,237,902 B2
(45) Date of Patent: Feb. 25, 2025

(54) ENHANCED BEAM MANAGEMENT FOR 5G SYSTEMS

(71) Applicant: Intel Corporation, Santa Clara, CA (US)

(72) Inventors: Guotong Wang, Beijing (CN); Gang Xiong, Portland, OR (US); Alexei Davydov, Nizhny Novgorod (RU); Seunghee Han, San Jose, CA (US); Daewon Lee, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 312 days.

(21) Appl. No.: 17/306,550

(22) Filed: May 3, 2021

(65) Prior Publication Data
US 2021/0258065 A1 Aug. 19, 2021

Related U.S. Application Data

(60) Provisional application No. 63/062,305, filed on Aug. 6, 2020, provisional application No. 63/019,885, filed on May 4, 2020.

(51) Int. Cl.
*H04B 7/06* (2006.01)
*H04L 5/00* (2006.01)
*H04W 56/00* (2009.01)
*H04W 74/0833* (2024.01)
*H04W 76/19* (2018.01)

(52) U.S. Cl.
CPC ........ *H04B 7/0695* (2013.01); *H04W 56/001* (2013.01); *H04W 74/0833* (2013.01); *H04W 76/19* (2018.02); *H04L 5/0007* (2013.01)

(58) Field of Classification Search
CPC . H04W 72/23; H04W 72/231; H04W 72/232; H04W 72/0446; H04W 72/0453; H04W 74/0833; H04W 76/10; H04W 76/19; H04W 56/001; H04L 27/261; H04L 5/0014; H04L 5/0016; H04L 5/0023; H04L 5/0005; H04L 5/0007; H04L 5/001; H04L 5/0048; H04L 5/005; H04L 5/0051; H04L 5/0091; H04L 5/0092; H04L 5/0094; H04B 7/0695; H04B 7/06952; H04B 7/063; H04B 7/0623; H04B 7/088
See application file for complete search history.

(56) References Cited

U.S. PATENT DOCUMENTS

2022/0174704 A1* 6/2022 Takano ................ H04W 72/02
2022/0264493 A1* 8/2022 Harada ................ H04W 48/10
2023/0013657 A1* 1/2023 Yu ......................... H04W 24/08

OTHER PUBLICATIONS

3GPP, "3rd Generation Partnership Project; Technical Specification Group Services and System Aspects; System architecture for the 5G System (5GS); Stage 2 (Release 15)", 3GPP TS 23.501 V15.9.0, Mar. 2020, 248 pages.
3GPP, "3rd Generation Partnership Project; Technical Specification Group Radio Access Network; NG-RAN; NG Application Protocol (NGAP) (Release 15)", 3GPP TS 38.413 V15.7.0, 331 pages.

* cited by examiner

*Primary Examiner* — Peter Chen
(74) *Attorney, Agent, or Firm* — Schwabe, Williamson & Wyatt, P.C.

(57) ABSTRACT

Methods, systems, and storage media are described for beam management for higher-frequency systems, such as, for example, those above 52.6 GHz. Other embodiments may be described and/or claimed.

19 Claims, 15 Drawing Sheets (a) Beam swept beam failure recovery request transmission over 2-step MsgA 1500 

Retrieving configuration information from memory, wherein the configuration information includes an indication that a plurality of synchronization signal blocks (SSBs) are frequency division multiplexed (FDMed) over a common set of orthogonal frequency division multiplexing (OFDM) symbols, and an indication that each SSB in the plurality of SSBs has a common cell identifier
1505

Encoding a message for transmission to a user equipment (UE) that includes the configuration information
1510

FIG. 15A

ENHANCED BEAM MANAGEMENT FOR 5G SYSTEMS

CROSS REFERENCE TO RELATED APPLICATIONS

The present application claims priority to U.S. Provisional Patent Application No. 63/019,885, which was filed May 4, 2020 and U.S. Provisional Patent Application No. 63/062,305, which was filed Aug. 6, 2020, the disclosures of which are hereby incorporated by reference.

FIELD

Various embodiments generally may relate to the field of wireless communications. In particular, some embodiments of this disclosure are related to beam management for higher-frequency systems, such as, for example, those above 52.6 GHz.

BACKGROUND

Mobile communication has evolved significantly from early voice systems to today's highly sophisticated integrated communication platform. The next generation wireless communication system, fifth generation (5G), or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich content and services.

For 5G systems, communication on millimeter wave (mmWave) frequency band has attracted significantly attention from the industry, since it can provide wider bandwidth to support the future integrated communication system. The beam forming is a critical technology for the implementation of high frequency band system due to the fact that the beam forming gain can compensate the severe path loss caused by atmospheric attenuation, improve the SNR, and enlarge the coverage area. By aligning the transmission beam to the target UE, radiated energy is focused for higher energy efficiency, and mutual UE interference is suppressed.

In 5G NR Rel-15/Rel-16, SS/PBCH Block (SSB), which contains synchronization signals, is transmitted periodically and could be used for beam management purpose. With multi-beam operation, each SSB is intended for a specific gNB Tx beam. The periodicity of SSB is denoted as SS Burst Set Period.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 15A and 15B, and 15C illustrate examples of operation flow/algorithmic structures in accordance with some embodiments.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

In 5G NR Rel-15/Rel-16, SS/PBCH Block (SSB), which contains synchronization signals, is transmitted periodically and could be used for beam management purpose. With multi-beam operation, each SSB is intended for a specific gNB Tx beam. The periodicity of SSB is denoted as SS Burst Set Period.

Figure 1:
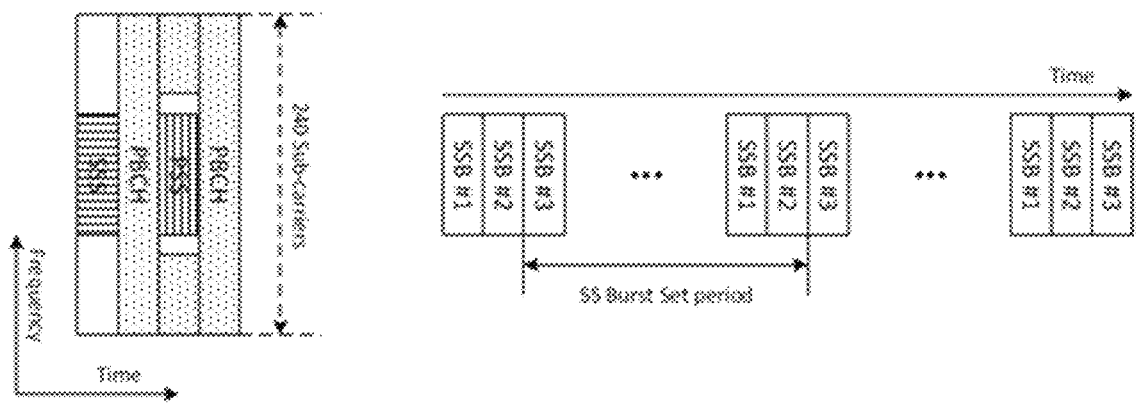
FIG. 1 illustrates an example of an SSB structure and transmission in accordance with some embodiments.

The SSB is composed of NR PSS (Primary Synchronization Signal), NR SSS (Secondary Synchronization Signal) and NR PBCH (Physical Broadcast Channel). The SSB is transmitted with a single antenna port. The SSB with the same index recurring with the SSB periodicity is QCLed. FIG. 1 shows the SSB structure and example of transmission.

In NR Rel-15/Rel-16, the maximum number of SSBs is 64 for Frequency Range 2 (FR2), which means the SSB index (0-63) is indicated by 6 bits. For SSB index, 3 bits are carried by PBCH contents, and the other 3 bits are indicated by 8 different PBCH DMRS sequences.

Further, the gNB could transmit multiple SSBs in different frequency locations, e.g. SSBs with different center frequency. However, from the UE perspective, it will treat different SSBs transmitted in different frequency location as SSB corresponding to different cells, e.g., one cell is associated with a single frequency location.

For beam management procedure, the gNB could configure the UE with multiple SSB resources only from the serving cell as indicated by logical SSB indexes via RRC information element CSI-SSB-ResourceSet. After Tx/Rx beam sweeping the UE could report to gNB the Tx beam(s) that can be used for the DL/UL transmission. The Tx beam indication is performed using SSB Resource Indicator (SSBRI). Therefore, with the existing beam management framework based on SSB, only one gNB Tx beam is transmitted to the UE at a time instance and only the SSBs from the same cell/carrier can be configured for beam management.

For higher frequency, e.g., above 60 GHz or Tera Hertz (THz), a larger number of Tx beams may be transmitted to the UE for beam management purposes. For example, for above 60 GHz, 1024 Tx beams can be considered. With the existing beam management framework based on SSB, a total of 1024 SSBs transmissions in different time instances may be required, which may result in a large transmission latency.

To address this issue, one possible solution to accelerate the beam sweeping on SSB is to introduce FDMed (Frequency Domain Multiplexed) SSB for beam management, as proposed in this disclosure. The gNB is equipped with multiple antenna panels and could transmit multiple SSBs which are FDMed in the same OFDM symbols. In this way, multiple Tx beams could be measured by the UE simultaneously and the beam sweeping can be accelerated.

The current beam management based on SSB only allows TDM multiplexing of SSB. Moreover, all SSB transmission should be confined to the same frequency location and physical cell ID of the same cell.

This disclosure describes SSB-based beam management allowing FDM multiplexing of SSB in the same OFDM symbols.

FDMed SSB for Beam Management

Figure 2:
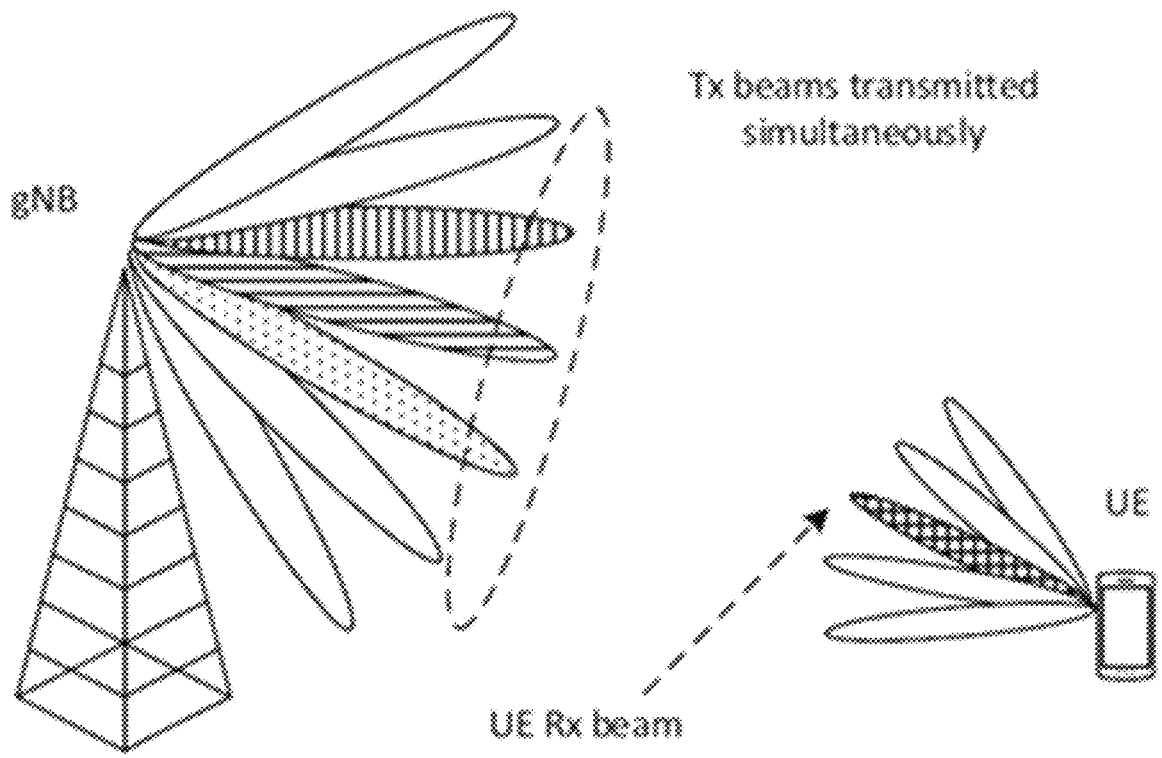
FIG. 2 illustrates an example of a next-generation NodeB (gNB) transmission in accordance with some embodiments.

In an embodiment, the gNB is equipped with multiple antenna panels and can simultaneously transmit multiple Tx beams from different panels to the UE. FIG. 2 shows an example of the operation.

The gNB could configure multiple SSBs which are FDMed over the same OFDM symbols, e.g. SSBs occupy different frequency resources in the same OFDM symbols. The multiple SSBs are configured with the same Cell ID. From the UE perspective, the UE treats the FDMed SSBs are from the same cell. The FDMed SSBs could be mapped to the same antenna port since they are FDMed. Alternatively, the different SSBs could be configured with different antenna port.

Figure 3:
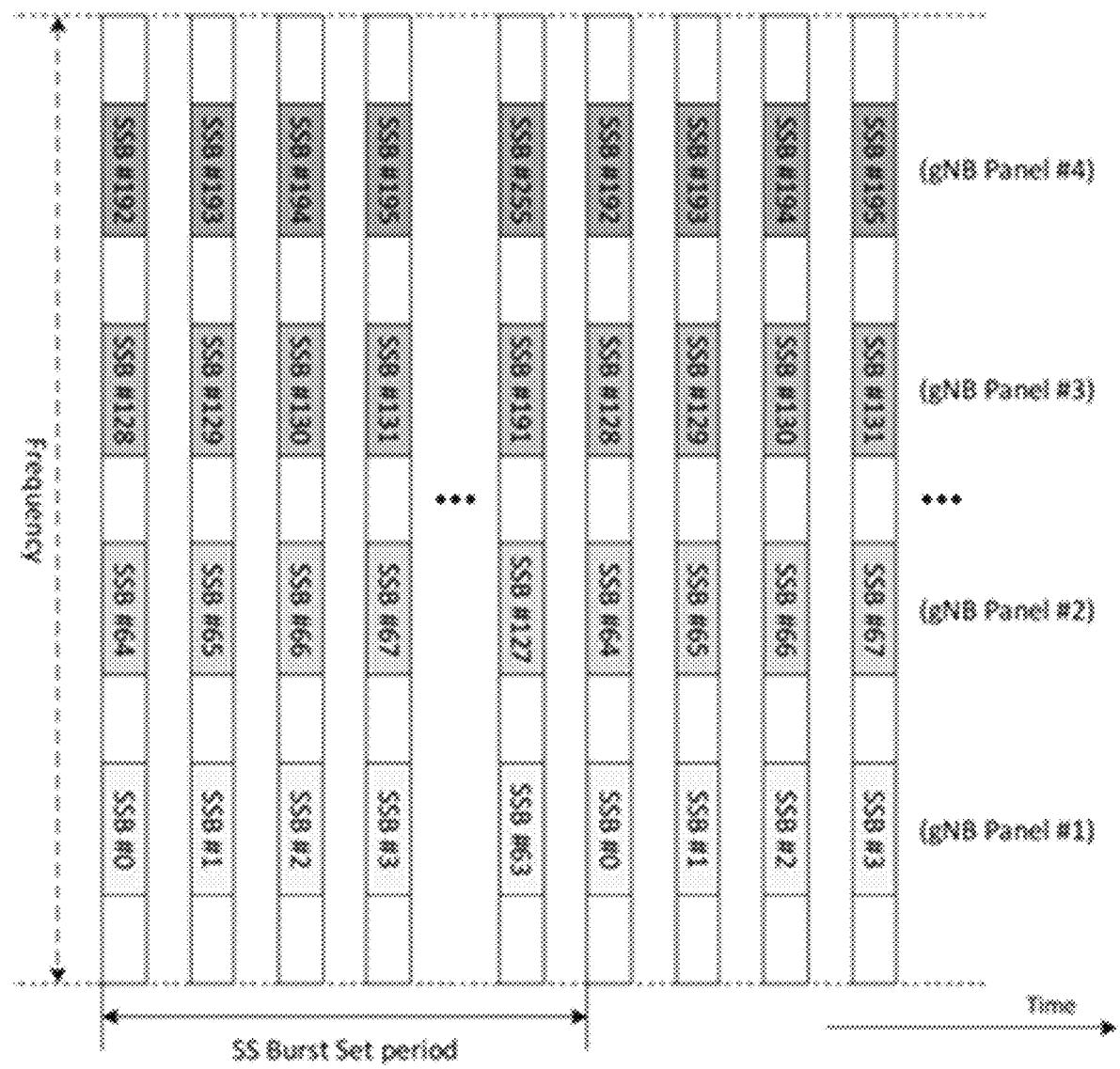
FIG. 3 illustrates an example of frequency division multiplexed (FDMed) SSBs in accordance with some embodiments.

FIG. 3 shows an example of the FDMed SSBs. In the example, all the SSBs are configured with the same Cell ID. On the same frequency position, the SSB index is sequentially numbered in an ascending order within one SS Burst Set Period. The SSB with the same index recurring with the SSB periodicity is QCLed. In this example, the gNB could transmit 4 Tx beams simultaneously to the UE. In the RRC information element CSI-SSB-ResourceSet., the gNB could configure the SSBs over the same OFDM symbols to the UE, for example, SSB #0, SSB #64, SSB #128, and SSB #192.

The value range of SSB index should be extended to larger than 64, in order to support FDMed SSBs. The following examples shows how to extend the SSB index value.

Example A: SSB index from 0 to 255 with 8 bits
  Alt 1: 3 bits of the SSB index are carried by PBCH content (same as Rel-15), and the other 5 bits of the SSB index are indicated by 32 different PBCH DMRS sequences (extended from 3 bits in Rel-15 to 5 bits).
  Alt 2: 3 bits of the SSB index are carried by PBCH content (same as Rel-15), one bit occupies the spare bit in MIB (Master Information Block) carried by PBCH, and the rest 4 bits of the SSB index are indicated by 16 different PBCH DMRS sequences (extended from 3 bits in Rel-15 to 4 bits).

Example B: SSB index from 0 to 128 with 7 bits
  Alt 1: 3 bits of the SSB index are carried by PBCH content (same as Rel-15), and the other 4 bits of the SSB index are indicated by 16 different PBCH DMRS sequences (extended from 3 bits in Rel-15 to 4 bits).
  Alt 2: 3 bits of the SSB index are carried by PBCH content (same as Rel-15), one bit occupies the spare bit in MIB (Master Information Block) carried by PBCH, and the rest 3 bits of the SSB index are indicated by 8 different PBCH DMRS sequences (same as Rel-15).

The SSB pattern in frequency domain, e.g., how many SSBs are transmitted in FDMed manner and the frequency position of each SSB can be delivered in System Information Block (SIB), for example, SIB 1. New RRC parameters could be introduced to SIB1, for example, ssb-FDMed to indicate the number of FDMed SSBs over the same OFDM symbols, and ssb-FrequencyPosition to indicate the SSB position in frequency domain.

Alternatively, the SSB position in frequency is delivered to the UE when the gNB configures the UE with SSB indexes for beam management in the RRC information element CSI-SSB-ResourceSet. An example of the configuration is shown as below. The parameter ssbFrequency provides the information on the frequency position of the configured SSBs.

CSI-SSB-ResourceSet-r17 ::=SEQUENCE {
  csi-SSB-ResourceSetID CSI-SSB-ResourceSetId,
  csi-SSB-ResourceList SEQUENCE (SIZE(1 . . . maxNrofCSI-SSB-ResourcePerSet)) OF SSB-Index,
  ssbFrequency SEQUENCE (SIZE(1 . . . maxNrofCSI-SSB-ResourcePerSet)) OF ARFCN-ValueNR,
  . . .
}

In another embodiment, when gNB transmits multiple Tx beams over SSB from multiple panels, the SSB from different Tx beams are with the same content (PSS/SSS and PBCH are the same). And the SSB from different Tx beams are sent over the same time and frequency resources. From the UE perspective, it can be viewed as a composite of multiple Tx beams. For example, the same SSB are delivered with 4 Tx beams, and the UE treats it as a wider beam which is a composite of 4 Tx beams.

Alternatively, the gNB could send multiple Tx beams for SSB over the same time and frequency resources, while the content of the SSB are different to identify Tx beams. The Tx beam could be identified by PBCH content and/or PBCH DMRS sequences.

In another embodiment, note that in NR Rel-15, a bitmap which is provided by higher layer parameter ssb-PositionsInBurst in SIB1 and ServingCellConfigCommon, is used to indicate the actually transmitted SS Block position in SS block potential position. Note that this information is used to allow UE to perform rate-matching of physical downlink shared channel (PDSCH) which are partially overlapping with SSB resource in time and frequency. When SSB overlaps with a physical downlink control channel (PDCCH) candidate at least one resource element (RE), UE is not required to monitor the PDCCH candidate.

In cases when multiple SSBs are multiplexed in an FDM manner in a same symbol, ssb-PositionInFrequency may also be configured in SIB1 and/or ServingCellConfigCommon, and can be used to indicate the frequency locations of multiple SSB transmission in a same symbol. This can allow UE to perform rate-matching of PDSCH around the SSB in time and frequency domain.

In another option, the frequency location of multiple SSBs can be derived from the detected SSB and the number of SSBs in a same symbol. In one example, the frequency gap between different SSB transmissions can be predefined in the specification or configured by higher layers via minimum system information (MSI), remaining minimum system information (RMSI), other system information (OSI) or determined in accordance with the system bandwidth. Based on this, UE can derive the frequency location of different SSBs in the system bandwidth and perform rate-matching or PDSCH accordingly.

In another embodiment, in order to support FDMed SSBs for beam management and meanwhile to maintain backward compatibility as much as possible, a new mapping between the physical layer SSB index and the RRC layer SSB index could be introduced.

The FDMed SSBs are configured with the same cell ID and the UE treats the FDMes SSBs are from the same cell. Over the same OFDM symbol, the FDMed SSBs are also configured with the same physical layer SSB index $SSB_{PHY}$, which is ranging from 0 to 63 and indicated by 6 bits. The UE could obtain the physical layer SSB index using the same processing as Rel-15.

At the RRC layer, the logical SSB index $SSB_{RRC}$ is defined. And $SSB_{RRC}$ could be derived as:

$$SSB_{RRC}=SSB_{PHY}+I_{freq}\times(SSB_{max,PHY}+1)$$

where $SSB_{max,PHY}$ is the maximum value of the physical layer SSB index, for example, 63. $I_{freq}$ is the index of SSB position in frequency domain. For example, if 4 SSBs are FDMed in the same OFDM symbol, then $I_{freq}$ is ranging from 0 to 3.

In the RRC information element CSI-SSB-ResourceSet, the gNB should configure SSBs with the RRC layer SSB indexes ($SSB_{RRC}$) to the UE for beam management purpose. In System Information Block (SIB), for example, SIB1, the gNB should send information on how many SSBs are transmitted in FDMed manner and the frequency position of each SSB. New RRC parameters could be introduced to SIB1, for example, ssb-FDMed to indicate the number of FDMed SSBs over the same OFDM symbols, and ssb-FrequencyPosition to indicate the SSB position in frequency domain. Alternatively, SSB frequency information could be sent to the UE in CSI-SSB-ResourceSet, including the number of FDMed SSBs and the frequency position of each configured SSB index.

Figure 4:
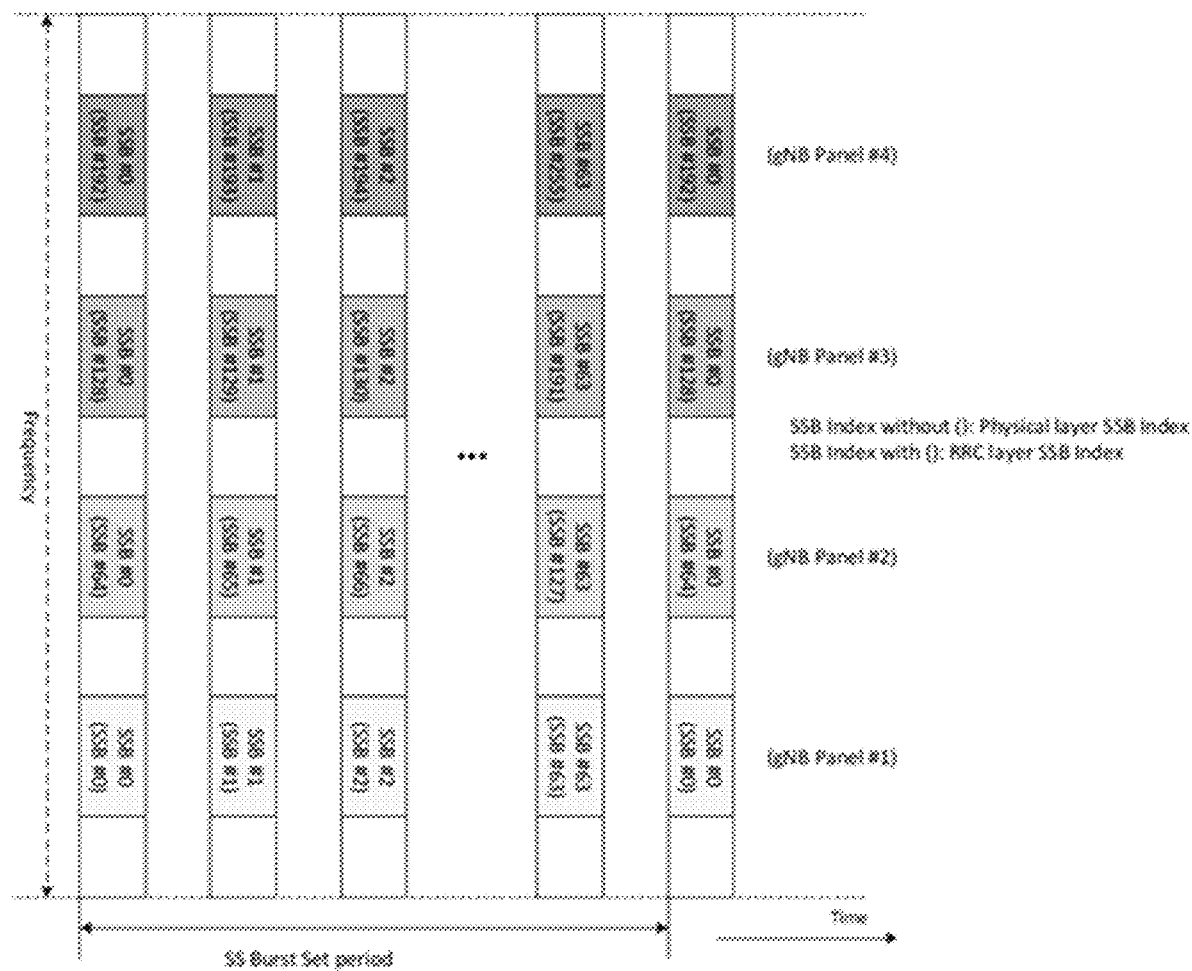
FIG. 4 illustrates an example of FDMed SSBs with different indexing between the physical layer and radio resource control (RRC) layer in accordance with some embodiments.

The SSB with the same physical layer SSB index and with the same frequency position recurring with the SSB periodicity is QCLed. In other words, the SSB with the same RRC layer SSB index recurring with the SSB periodicity is QCLed. FIG. 4 shows an example of the operation.

Enhanced Beam Failure Recovery Above 52.6 GHz Carrier Frequency

For 5G systems, communication on millimeter wave (mmWave) frequency band has attracted significantly attention from the industry, since it can provide wider bandwidth to support the future integrated communication system. The beam forming is a critical technology for the implementation of high frequency band system due to the fact that the beam forming gain can compensate the severe path loss caused by atmospheric attenuation, improve the SNR, and enlarge the coverage area. By aligning the transmission beam to the target UE, radiated energy is focused for higher energy efficiency, and mutual UE interference is suppressed.

Due to blockage or UE's movement or rotation, a current beam pair may not provide good performance. In this case, UE may trigger beam failure recovery (BFR) procedure so as to allow UE and gNB to re-establish a new beam pair for communication. In Rel-15, after beam failure, UE selects one beam as a new beam which is based on measurement from synchronization signal block (SSB) or channel state information-reference signal (CSI-RS). The new beam is selected such that the measured Layer 1-reference signal received power (L1-RSRP) is above threshold. Note that UE may use contention based or contention free 4-step random access (RACH) procedure for BFR. Further, UE monitor search space-BFR (SS-BFR) which is based on newly identified beam.

In Rel-16, BFR for secondary cell (SCell) was specified, which includes two steps to allow UE to report beam failure information on SCell in special cell (SpCell). In step 1, physical uplink control channel-BFR (PUCCH-BFR) is used to request SCell BFR, where PUCCH-BFR has higher priority than other scheduling request (SR). Further, in step 2, medium access control-control element (MAC-CE) on physical uplink shared channel (PUSCH) is used to carry SCell BFR information, which includes one failed component carrier (CC) index and new beam index on the failed CC.

For systems operating above 52.6 GHz carrier frequency, especially for the Terahertz frequency range, it is envisioned very narrow beam needs to be employed in order to achieve sufficient coverage. Further, due to blockage or UE's movement or rotation, it is very likely that beam failure may happen very frequently at this frequency range. The existing BFR mechanism, however, may not perform well due to either long latency or large overhead. For instance, 4-step contention based RACH procedure may introduce long delay due to contention based nature of RACH procedure for BFR. To address this issue, enhancement on BFR mechanism may need to be considered for system operating above 52.6 GHz carrier frequency.

Embodiments disclosed herein may be directed to enhanced BFR for system operating above 52.6 GHz carrier frequency to address these and other issues.

Enhanced Beam Failure Recovery (BFR) Mechanism for Above 52.6 GHz Carrier Frequency As mentioned above, for system operating above 52.6 GHz carrier frequency, especially for Terahertz frequency range, it is envisioned very narrow beam needs to be employed in order to achieve sufficient coverage. Further, due to blockage or UE's movement or rotation, it is very likely that beam failure may happen very frequently at this frequency range. The existing BFR mechanism, however, may not perform well due to either long latency or large overhead. For instance, 4-step contention based RACH procedure may introduce long delay due to contention based nature of RACH procedure for BFR. To address this issue, enhancement on BFR mechanism may need to be considered for system operating above 52.6 GHz carrier frequency.

Embodiments of enhanced BFR mechanism for system operating above 52.6 GHz carrier frequency are provided as follows:

In one embodiment, more than one physical random access channel (PRACH) configuration including different PRACH formats may be configured for a UE by higher layers via minimum system information (MSI), remaining minimum system information (RMSI), other system information (OSI) or dedicated radio resource control (RRC) signaling. More specifically, a first PRACH configuration may be used for normal procedure for 4-step or 2-step RACH, while a second PRACH configuration may be used for BFR.

In one example, a first PRACH format may have long guard period in order to accommodate relatively large cell size or timing advance (TA), while a second PRACH format may have short guard period to accommodate TA difference between different beams.

Note that a first PRACH configuration including a first PRACH format and a second PRACH configuration including a second PRACH format may be multiplexed in a time division multiplexing (TDM) or frequency division multiplexing (FDM) manner.

Figure 5:
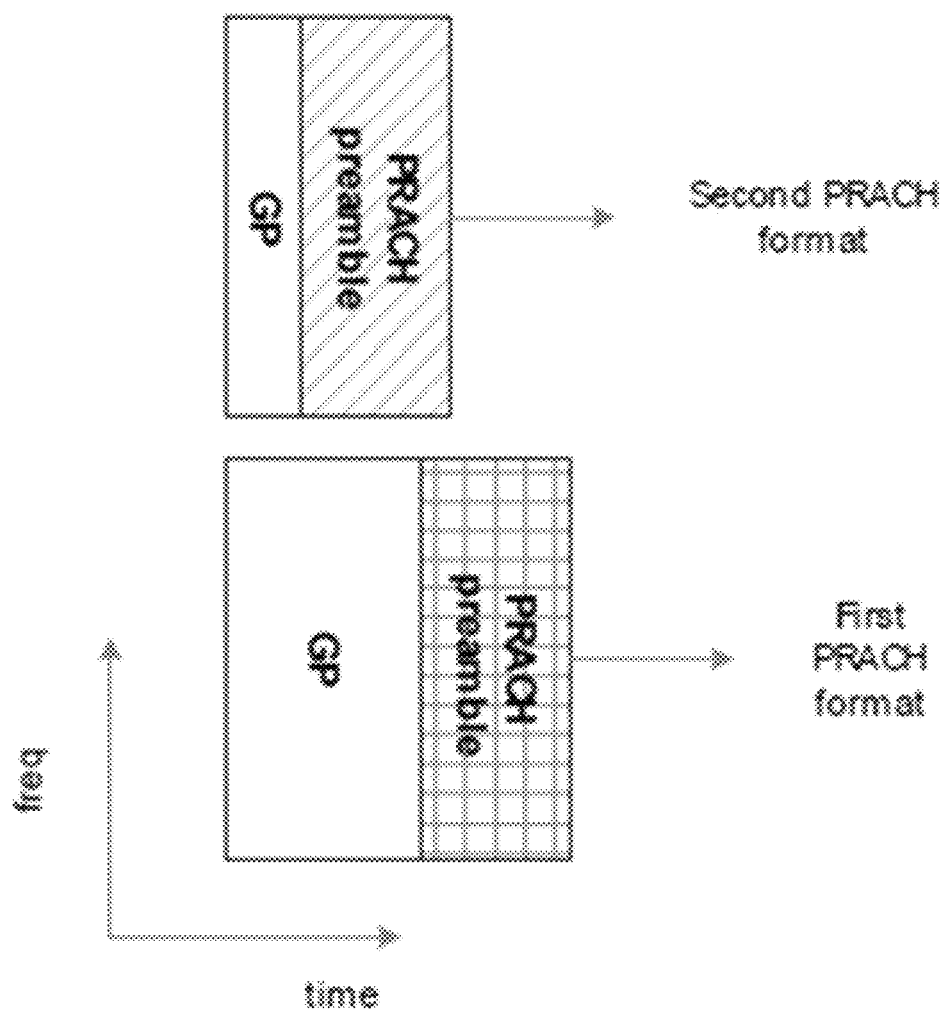
FIG. 5 illustrates an example of multiple physical random access channel (PRACH) formats in a network in accordance with some embodiments.

FIG. 5 illustrates one example of multiplexing two PRACH formats in an FDM manner. In the figure, first PRACH format with a longer guard period is targeted for initial access procedure while second PRACH format with a shorter guard period can be used for BFR.

In another embodiment, contention free 2-step RACH resource for MsgA PRACH and PUSCH may be configured for a UE for BFR. The MsgA PRACH and PUSCH could be used to transmit the beam failure recovery request. After beam failure is detected, the UE should identify one or more new candidate gNB Tx beams whose quality is higher than certain configured threshold. When sending all the beam failure recovery request over MsgA PRACH and PUSCH, the UE may transmit MsgA PRACH and PUSCH with the same spatial relation, e.g. the spatial relation associated with one newly identified candidate gNB Tx beam, for example, the strongest one. In the MsgA PUSCH, the information of multiple new candidate Tx beams could be reported.

The information of multiple new candidate beams may include the gNB Tx beam index, component carrier (CC) index and bandwidth part (BWP) index and/or beam quality, e.g. Layer 1-reference signal received power (L1-RSRP) and/or Layer 1-signal to interference and noise ratio (L1-SINR). Note that the gNB Tx beam may be defined in a form of synchronization signal block resource indicator (SSBRI) and/or channel state information-reference signal resource indicator (CRI).

After sending the beam failure recovery request over MsgA PRACH and PUSCH, the UE should monitor a dedicated CORESET/Search Space for beam failure recovery response, e.g. a physical downlink control channel (PDCCH) or scheduled physical downlink shared channel (PDSCH). When gNB sends the beam failure recovery response over the dedicated CORESET/Search Space, the same beam as the one associated with beam failure recovery request transmission should be used.

Figure 6:
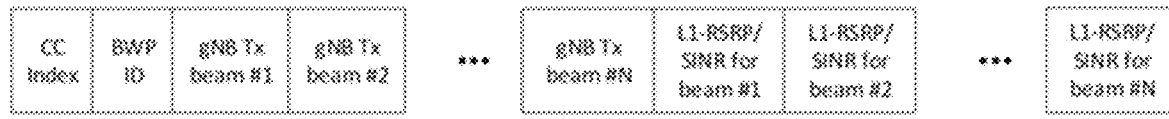
FIG. 6 illustrates an example of multiple transmit (Tx) beam information over MsgA physical uplink shared channel (PUSCH) in accordance with some embodiments.

FIG. 6 shows an example of the MsgA PUSCH containing multiple Tx beams information for beam failure recovery. In the example, the CC index and BWP ID indicate over which component carrier and BWP the new candidate beams are identified. Further, the identified gNB Tx beam and beam report including L1-RSRP/L1-SINR can be included in a medium access control-control element (MAC-CE), which is carried by the MsgA PUSCH.

Figure 7:
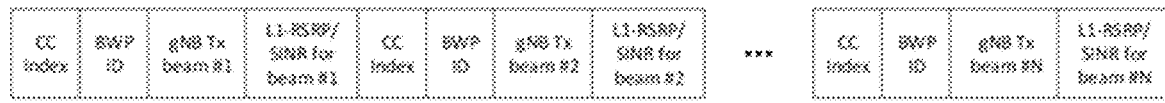
FIG. 7 illustrates another example of multiple transmit Tx beam information over MsgA PUSCH in accordance with some embodiments.

FIG. 7 illustrates another example of multiple Tx beam information carried by MsgA PUSCH. In the example, CC index and BWP ID are included for each gNB Tx beam.

In another example, the multiple Tx beams are reported in descending or ascending order of beam quality, e.g. the first Tx beam is the strongest or weakest, respectively. In this case, the L1-RSRP/L1-SINR could be optional.

Note that in the above option, number of gNB Tx beams, e.g., N may be predefined in the specification, or configured by higher layers via NR remaining minimum system information (RMSI), NR other system information (OSI) or dedicated radio resource control (RRC) signaling.

Figure 8:
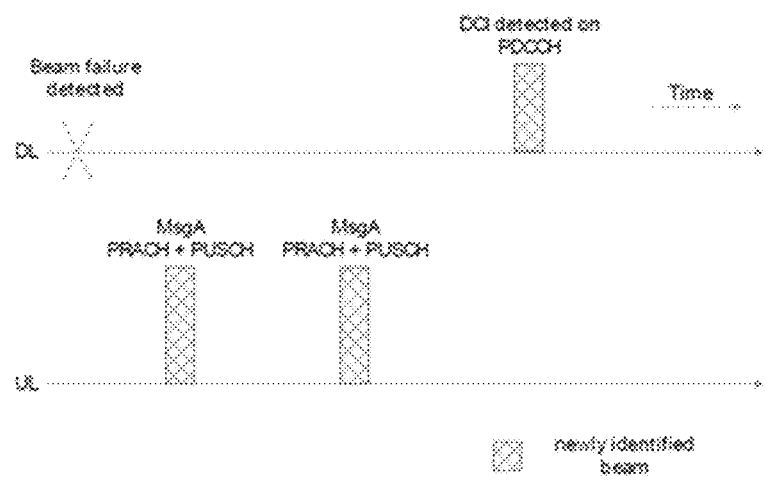
FIG. 8 illustrates an example of a beam failure recovery operation based on MsgA PRACH and PUSCH in accordance with some embodiments.

FIG. 8 shows an example of a procedure for beam failure recovery request over MsgA PRACH and PUSCH. In the example, it is assumed that MsgA PRACH and PUSCH are transmitted twice before UE receives the DCI on corresponding CORESET and search space which is configured for BFR. Further, the beam associated with MsgA transmission may or may not be included in the beam reporting carried by the MsgA PUSCH.

Figure 9:
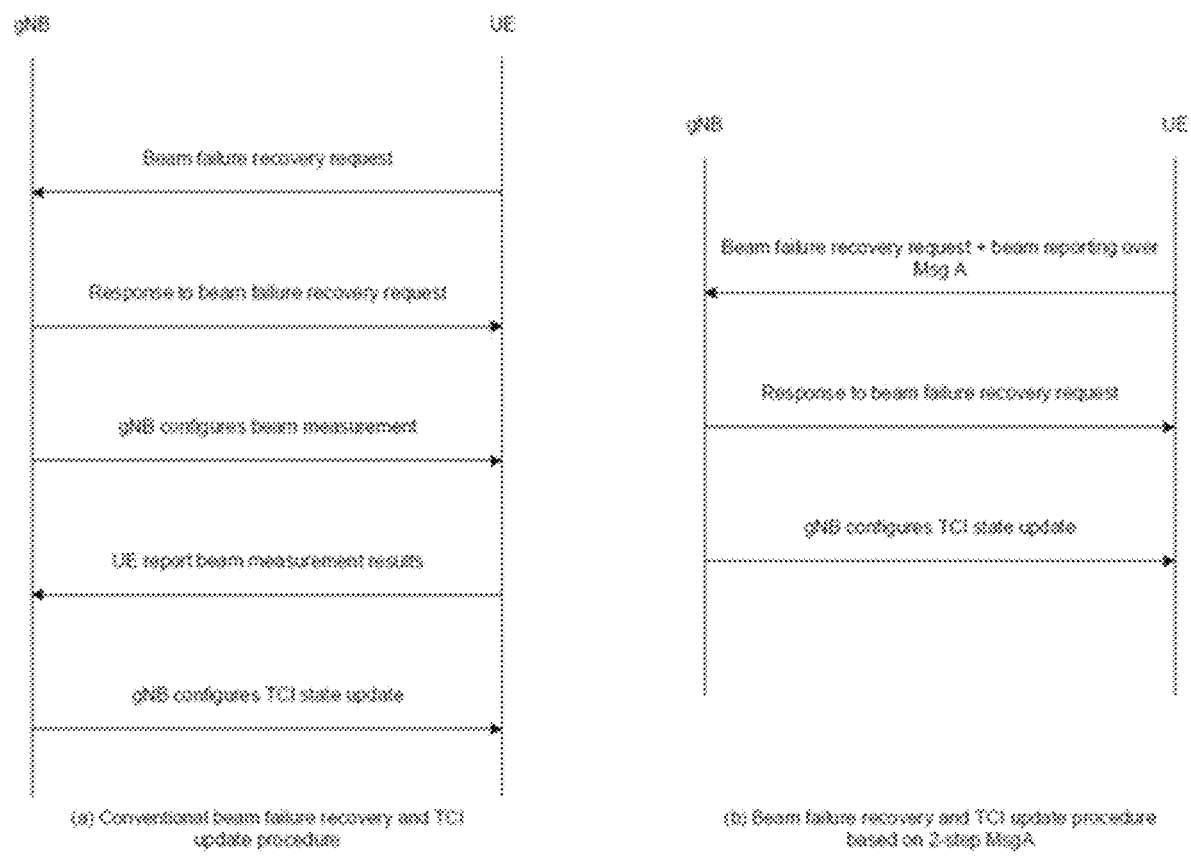
FIG. 9 illustrates an example of a comparison between two-step RACH based beam failure recovery (BFR) and conventional BFR in accordance with some embodiments.

Based on the beam reporting carried by MsgA PUSCH, the gNB could further configure TCI (Transmission Configuration Indicator) state update to the UE. In this way, the overall overhead could be reduced. FIG. 9 shows the comparison between 2-step RACH based BFR and the conventional BFR. It can be seen that for conventional BFR mechanism, after beam failure recovery response is received, the gNB needs to further inform UE to report beam measurement results, which results in additional overhead.

In another embodiment, when sending beam failure recovery request over MsgA PRACH and PUSCH, the beam failure recovery request could be transmitted with beam sweeping if multiple gNB Tx beams are identified.

Figure 10A:
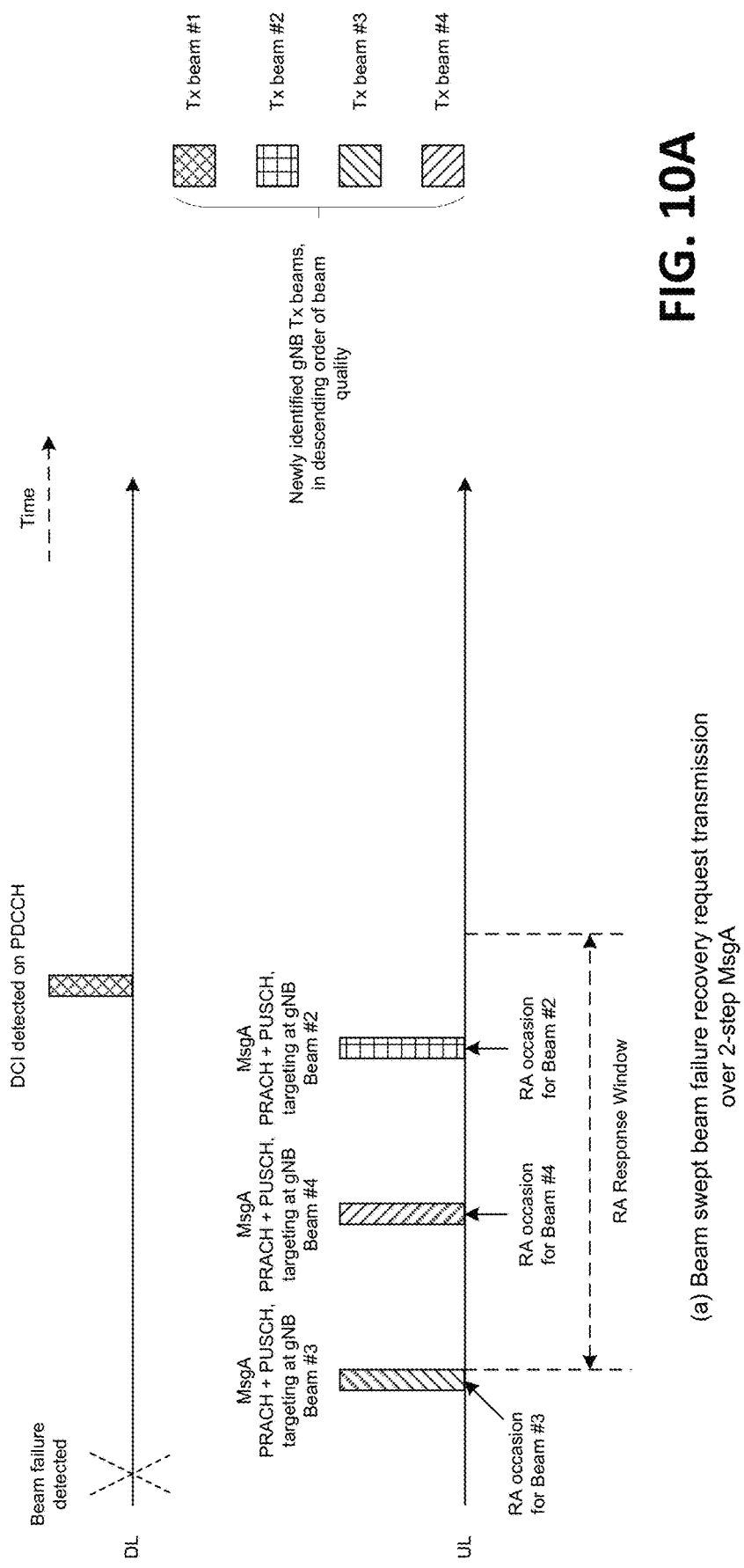
FIGS. 10A and 10B illustrate another example of a BFR operation based on MsgA PRACH and PUSCH in accordance with some embodiments.

Part (a) in FIG. 10A shows an example of a MsgA transmission for BFR with beam sweeping. After sending the first beam failure recovery request, the UE should monitor the dedicated CORESET/Search Space for beam failure recovery response. A default beam should be applied for the gNB to send the beam failure recovery response and for the UE to monitor the response. In an example, the default beam can be defined as the strongest beam/the first beam contained in the beam reporting carried by MsgA PUSCH. In this way, the delay for beam failure recovery could be reduced as multiple RACH occasions could be used to send the beam failure recovery request.

Figure 10B:
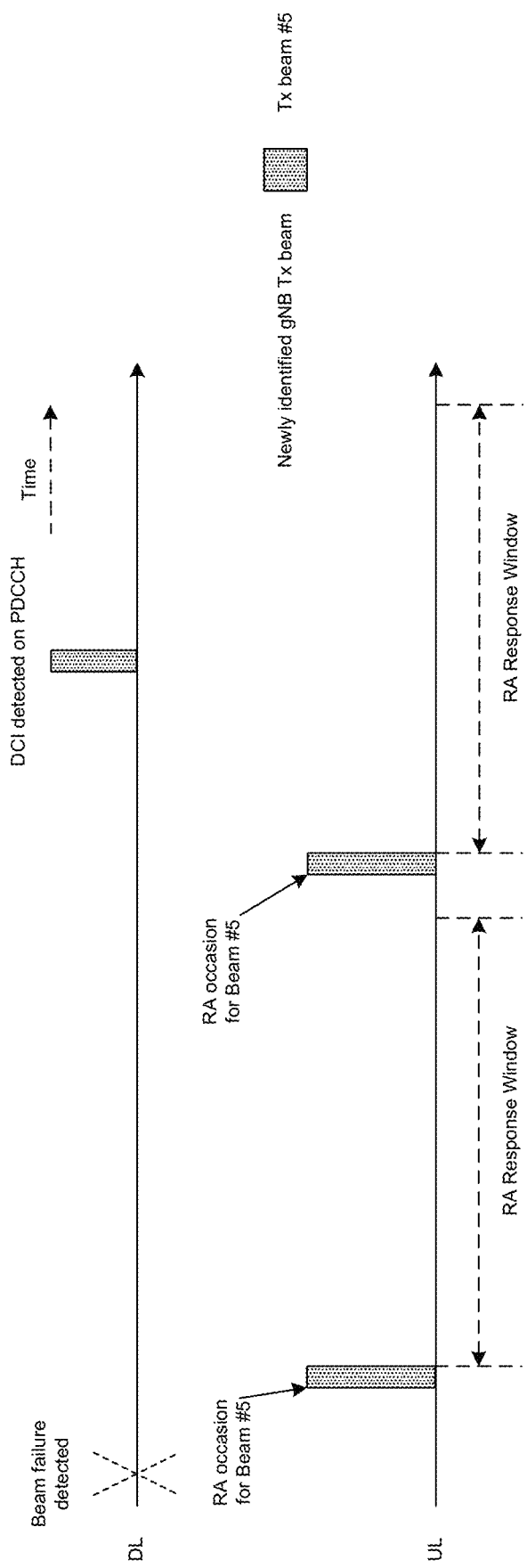

As shown in Part (a) of FIG. 10A, the first beam failure recovery request doesn't need to be sent targeting at the strongest identified Tx beam. After sending the first beam failure recovery request, the UE starts to monitor the dedicated CORESET with the strongest beam among those Tx beams contained in the beam reporting over MsgA PUSCH. As long as the response is not received, the UE can select the other RA occasion associated with another identified Tx beam to send the next beam failure recovery request, even if the RA response window is not expired. With the conventional BFR procedure as shown in Part (b) of FIG. 10B, after sending one BFR request, the UE needs to monitor the response. If the response is not received within the RA response window, then the UE sends another request. Therefore, in comparison, the BFR request over MsgA with beam sweeping operation could reduce the latency for beam failure recovery operation.

Figure 11:
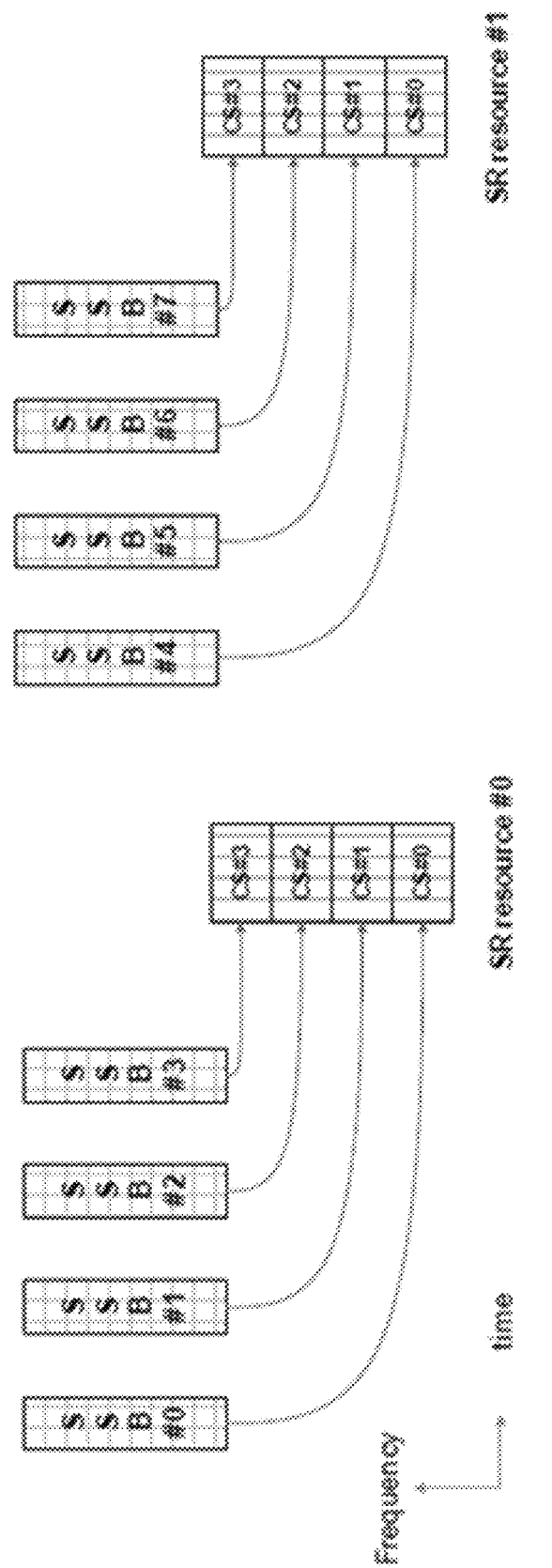
FIG. 11 illustrates an example of an SSB to scheduling request (SR) mapping in accordance with some embodiments.

In another embodiment, dedicated scheduling request (SR) resource may be configured for BFR for a given UE. In order to allow UE to transmit SR with identified new beam, SR to synchronization signal block (SSB) association may need to be established. Note that SSB indexes are mapped to valid SR resource in the following order:

First, in increasing order of cyclic shift indexes within a single SR resource
Second, in increasing order of frequency resource indexes for frequency multiplexed SR resources
Third, in increasing order of time resource indexes for time multiplexed SR resources within a slot
Fourth, in increasing order of indexes for slots FIG. 11 illustrates one example of SSB to SR association. In the example, 8 SSBs and 2 SR resources are assumed. Further, 4 cyclic shifts (CS) are considered within a SR resource. The initial CS values can be 0, 3, 6, 9 for a UE. Based on the SSB to SR association, SSB #0 is mapped to CS #0 in SR resource #0, SSB #1 is mapped to CS #1 in SR resource #1, etc.

In an example, after beam failure happens, if only one gNB Tx beam is identified, the UE should select the corresponding SR resource associated with the identified Tx beam to transmit the beam failure recovery request. Subsequently, the gNB would send the beam failure recovery response with the identified Tx beam.

In another example, after beam failure happens, multiple candidate Tx beams may be identified. Further, beam failure recovery request can be sent over multiple SR resources with beam sweeping. After sending one beam failure recovery request at time instance N targeting gNB Tx beam #X, after a configurable time window M, the UE starts to monitor the beam failure recovery response with the Tx beam #X until time instance N+M+L, where L is a time window, which can be configured by higher layers via MSI, RMSI (SIB1), OSI or RRC signaling. If the response is not received, then the UE transmits the next request targeting at the same Tx beam (#X) or another Tx beam (#Y).

In another embodiment, PRACH and/or PUCCH resources can be configured for SCell, which may be used for BFR of SCell and/or PCell. In one example, for 2-step RACH, MsgA PRACH may be triggered in SCell and MsgA PUSCH may carry beam report information of PCell and/or SCell.

Systems and Implementations

Figure 12:
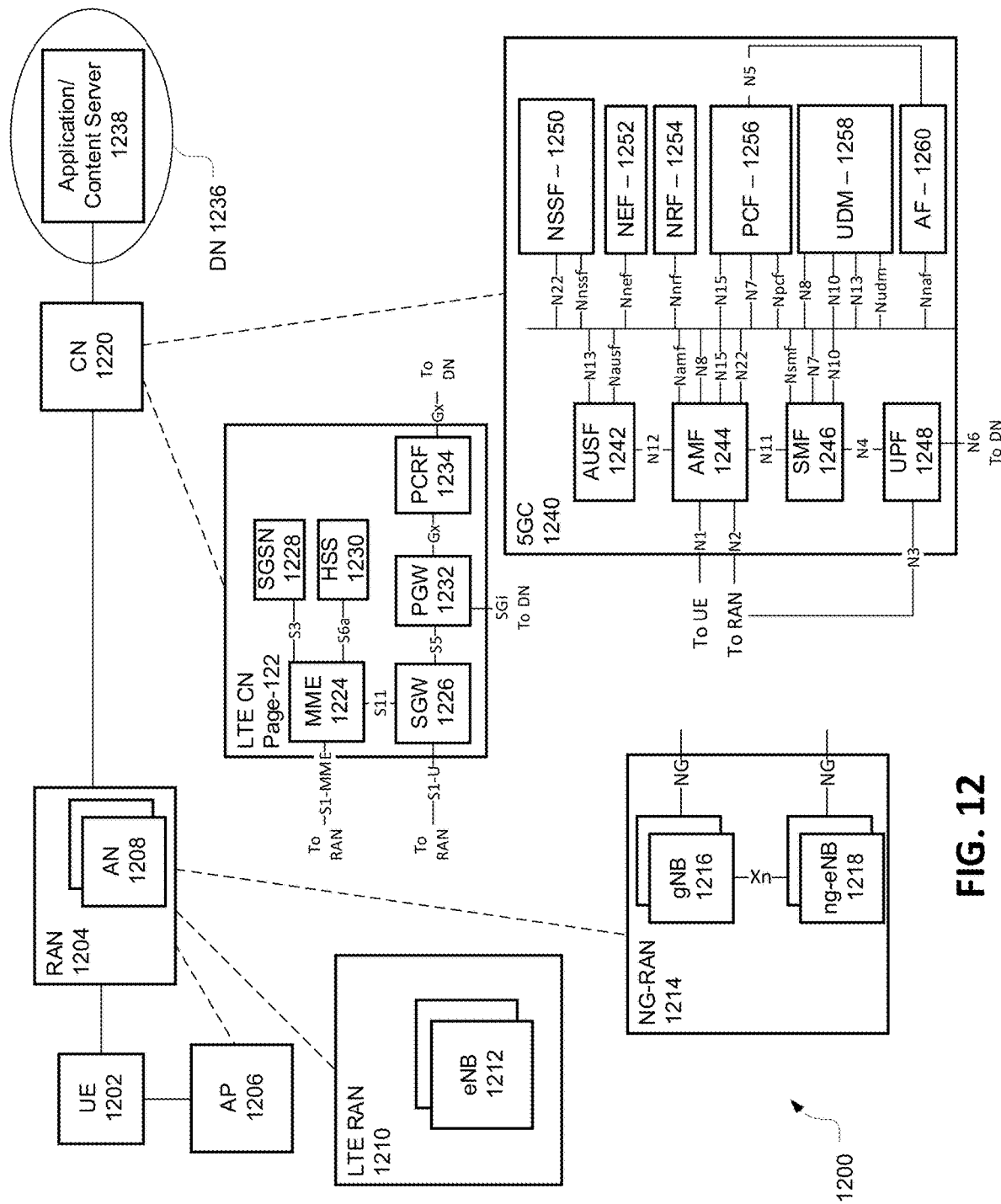
FIG. 12 depicts an example of a network in accordance with some embodiments.
Figure 13:
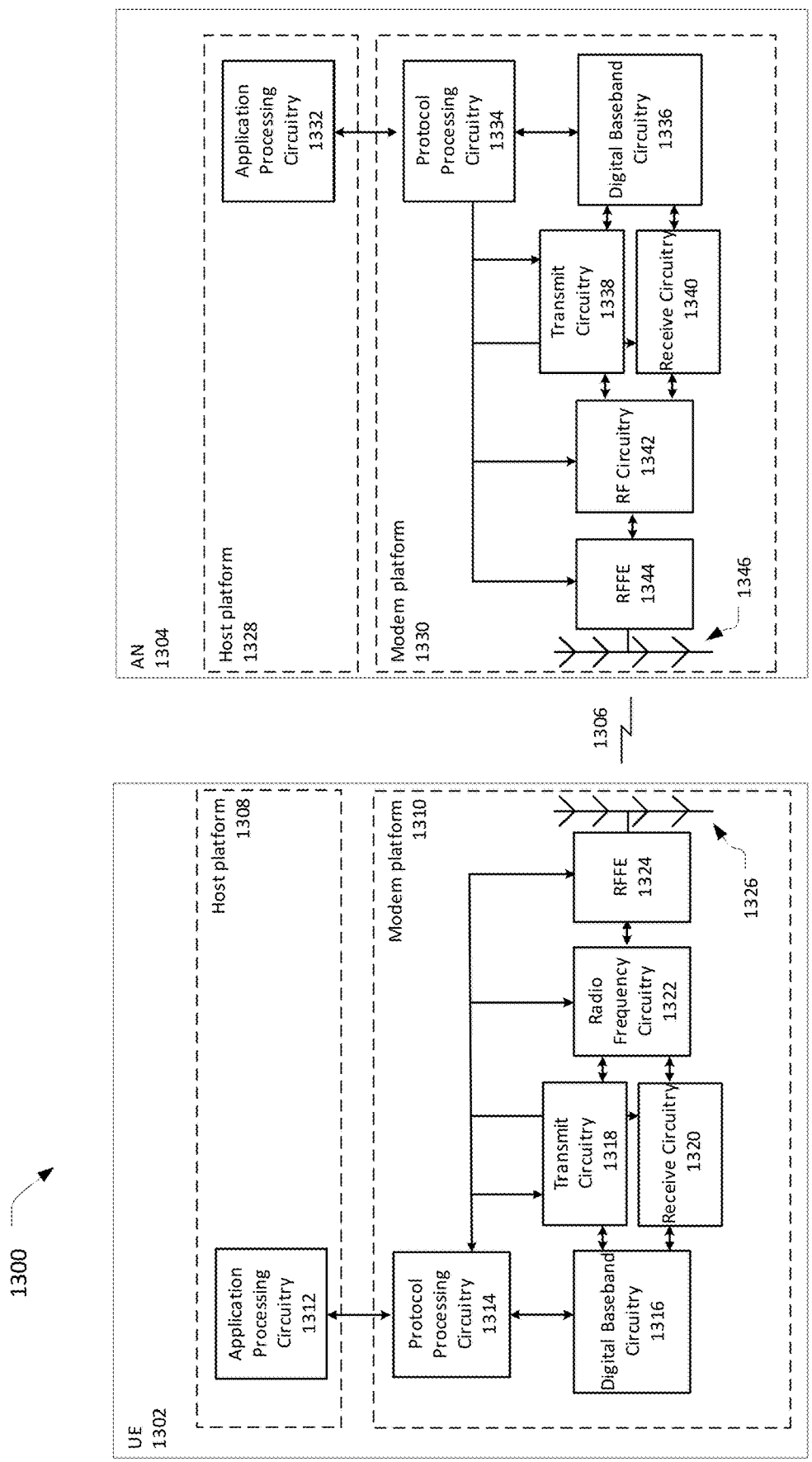
FIG. 13 depicts an example of a wireless network in accordance with some embodiments.

FIGS. 12-13 illustrate various systems, devices, and components that may implement aspects of disclosed embodiments. FIG. 12 illustrates a network 1200 in accordance with various embodiments. The network 1200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 1200 may include a UE 1202, which may include any mobile or non-mobile computing device designed to communicate with a RAN 1204 via an over-the-air connection. The UE 1202 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 1200 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 1202 may additionally communicate with an AP 1206 via an over-the-air connection. The AP 1206 may manage a WLAN connection, which may serve to offload some/all network traffic from the RAN 1204. The connection between the UE 1202 and the AP 1206 may be consistent with any IEEE 802.11 protocol, wherein the AP 1206 could be a wireless fidelity (Wi-Fi®) router. In some embodiments, the UE 1202, RAN 1204, and AP 1206 may utilize cellular-WLAN aggregation (for example, LWA/LWIP). Cellular-WLAN aggregation may involve the UE 1202 being configured by the RAN 1204 to utilize both cellular radio resources and WLAN resources.

The RAN 1204 may include one or more access nodes, for example, AN 1208. AN 1208 may terminate air-interface protocols for the UE 1202 by providing access stratum protocols including RRC, PDCP, RLC, MAC, and L1 protocols. In this manner, the AN 1208 may enable data/voice connectivity between CN 1220 and the UE 1202. In some embodiments, the AN 1208 may be implemented in a discrete device or as one or more software entities running on server computers as part of, for example, a virtual network, which may be referred to as a CRAN or virtual baseband unit pool. The AN 1208 be referred to as a BS, gNB, RAN node, eNB, ng-eNB, NodeB, RSU, TRxP, TRP, etc. The AN 1208 may be a macrocell base station or a low power base station for providing femtocells, picocells or other like cells having smaller coverage areas, smaller user capacity, or higher bandwidth compared to macrocells.

In embodiments in which the RAN 1204 includes a plurality of ANs, they may be coupled with one another via an X2 interface (if the RAN 1204 is an LTE RAN) or an Xn interface (if the RAN 1204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 1204 may each manage one or more cells, cell groups, component carriers, etc. to provide the UE 1202 with an air interface for network access. The UE 1202 may be simultaneously connected with a plurality of cells provided by the same or different ANs of the RAN 1204. For example, the UE 1202 and RAN 1204 may use carrier aggregation to allow the UE 1202 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 1204 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 1202 or AN 1208 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/ software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 1204 may be an LTE RAN 1210 with eNBs, for example, eNB 1212. The LTE RAN 1210 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 1204 may be an NG-RAN 1214 with gNBs, for example, gNB 1216, or ng-eNBs, for example, ng-eNB 1218. The gNB 1216 may connect with 5G-enabled UEs using a 5G NR interface. The gNB 1216 may connect with a 5G core through an NG interface, which may include an N2 interface or an N3 interface. The ng-eNB 1218 may also connect with the 5G core through an NG interface, but may connect with a UE via an LTE air interface. The gNB 1216 and the ng-eNB 1218 may connect with each other over an Xn interface.

In some embodiments, the NG interface may be split into two parts, an NG user plane (NG-U) interface, which carries traffic data between the nodes of the NG-RAN 1214 and a UPF 1248 (e.g., N3 interface), and an NG control plane (NG-C) interface, which is a signaling interface between the nodes of the NG-RAN 1214 and an AMF 1244 (e.g., N2 interface).

The NG-RAN 1214 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 1202 can be configured with multiple BWPs where each BWP configuration has a different SCS. When a BWP change is indicated to the UE 1202, the SCS of the transmission is changed as well. Another use case example of BWP is related to power saving. In particular, multiple BWPs can be configured for the UE 1202 with different amount of frequency resources (for example, PRBs) to support data transmission under different traffic loading scenarios. A BWP containing a smaller number of PRBs can be used for data transmission with small traffic load while allowing power saving at the UE 1202 and in some cases at the gNB 1216. A BWP containing a larger number of PRBs can be used for scenarios with higher traffic load.

The RAN 1204 is communicatively coupled to CN 1220 that includes network elements to provide various functions to support data and telecommunications services to customers/subscribers (for example, users of UE 1202). The components of the CN 1220 may be implemented in one physical node or separate physical nodes. In some embodiments, NFV may be utilized to virtualize any or all of the functions provided by the network elements of the CN 1220 onto physical compute/storage resources in servers, switches, etc. A logical instantiation of the CN 1220 may be referred to as a network slice, and a logical instantiation of a portion of the CN 1220 may be referred to as a network sub-slice.

In some embodiments, the CN 1220 may be an LTE CN 1222, which may also be referred to as an EPC. The LTE CN 1222 may include MME 1224, SGW 1226, SGSN 1228, HSS 1230, PGW 1232, and PCRF 1234 coupled with one another over interfaces (or "reference points") as shown. Functions of the elements of the LTE CN 1222 may be briefly introduced as follows.

The MME 1224 may implement mobility management functions to track a current location of the UE 1202 to facilitate paging, bearer activation/deactivation, handovers, gateway selection, authentication, etc.

The SGW 1226 may terminate an Si interface toward the RAN and route data packets between the RAN and the LTE CN 1222. The SGW 1226 may be a local mobility anchor point for inter-RAN node handovers and also may provide an anchor for inter-3GPP mobility. Other responsibilities may include lawful intercept, charging, and some policy enforcement.

The SGSN 1228 may track a location of the UE 1202 and perform security functions and access control. In addition, the SGSN 1228 may perform inter-EPC node signaling for mobility between different RAT networks; PDN and S-GW selection as specified by MME 1224; MME selection for handovers; etc. The S3 reference point between the MME 1224 and the SGSN 1228 may enable user and bearer information exchange for inter-3GPP access network mobility in idle/active states.

The HSS 1230 may include a database for network users, including subscription-related information to support the network entities' handling of communication sessions. The HSS 1230 can provide support for routing/roaming, authentication, authorization, naming/addressing resolution, location dependencies, etc. An S6a reference point between the HSS 1230 and the MME 1224 may enable transfer of subscription and authentication data for authenticating/authorizing user access to the LTE CN 1220.

The PGW 1232 may terminate an SGi interface toward a data network (DN) 1236 that may include an application/content server 1238. The PGW 1232 may route data packets between the LTE CN 1222 and the data network 1236. The PGW 1232 may be coupled with the SGW 1226 by an S5 reference point to facilitate user plane tunneling and tunnel management. The PGW 1232 may further include a node for policy enforcement and charging data collection (for example, PCEF). Additionally, the SGi reference point between the PGW 1232 and the data network 12 36 may be an operator external public, a private PDN, or an intra-operator packet data network, for example, for provision of IMS services. The PGW 1232 may be coupled with a PCRF 1234 via a Gx reference point.

The PCRF 1234 is the policy and charging control element of the LTE CN 1222. The PCRF 1234 may be communicatively coupled to the app/content server 1238 to determine appropriate QoS and charging parameters for service flows. The PCRF 1232 may provision associated rules into a PCEF (via Gx reference point) with appropriate TFT and QCI.

In some embodiments, the CN 1220 may be a 5GC 1240. The 5GC 1240 may include an AUSF 1242, AMF 1244, SMF 1246, UPF 1248, NSSF 1250, NEF 1252, NRF 1254, PCF 1256, UDM 1258, and AF 1260 coupled with one another over interfaces (or "reference points") as shown. Functions of the elements of the 5GC 1240 may be briefly introduced as follows.

The AUSF 1242 may store data for authentication of UE 1202 and handle authentication-related functionality. The AUSF 1242 may facilitate a common authentication framework for various access types. In addition to communicating with other elements of the 5GC 1240 over reference points as shown, the AUSF 1242 may exhibit an Nausf service-based interface.

The AMF 1244 may allow other functions of the 5GC 1240 to communicate with the UE 1202 and the RAN 1204 and to subscribe to notifications about mobility events with respect to the UE 1202. The AMF 1244 may be responsible for registration management (for example, for registering UE 1202), connection management, reachability management, mobility management, lawful interception of AMF-related events, and access authentication and authorization. The AMF 1244 may provide transport for SM messages between the UE 1202 and the SMF 1246, and act as a transparent proxy for routing SM messages. AMF 1244 may also provide transport for SMS messages between UE 1202 and an SMSF. AMF 1244 may interact with the AUSF 1242 and the UE 1202 to perform various security anchor and context management functions. Furthermore, AMF 1244 may be a termination point of a RAN CP interface, which may include or be an N2 reference point between the RAN 1204 and the AMF 1244; and the AMF 1244 may be a termination point of NAS (N1) signaling, and perform NAS ciphering and integrity protection. AMF 1244 may also support NAS signaling with the UE 1202 over an N3 IWF interface.

The SMF 1246 may be responsible for SM (for example, session establishment, tunnel management between UPF 1248 and AN 1208); UE IP address allocation and management (including optional authorization); selection and control of UP function; configuring traffic steering at UPF 1248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 1244 over N2 to AN 1208; and determining SSC mode of a session. SM may refer to management of a PDU session, and a PDU session or "session" may refer to a PDU connectivity service that provides or enables the exchange of PDUs between the UE 1202 and the data network 1236.

The UPF 1248 may act as an anchor point for intra-RAT and inter-RAT mobility, an external PDU session point of interconnect to data network 1236, and a branching point to support multi-homed PDU session. The UPF 1248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 1248 may include an uplink classifier to support routing traffic flows to a data network.

The NSSF 1250 may select a set of network slice instances serving the UE 1202. The NSSF 1250 may also determine allowed NSSAI and the mapping to the subscribed S-NSSAIs, if needed. The NSSF 1250 may also determine the AMF set to be used to serve the UE 1202, or a list of candidate AMFs based on a suitable configuration and possibly by querying the NRF 1254. The selection of a set of network slice instances for the UE 1202 may be triggered by the AMF 1244 with which the UE 1202 is registered by interacting with the NSSF 1250, which may lead to a change of AMF. The NSSF 1250 may interact with the AMF 1244 via an N22 reference point; and may communicate with another NSSF in a visited network via an N31 reference point (not shown). Additionally, the NSSF 1250 may exhibit an Nnssf service-based interface.

The NEF 1252 may securely expose services and capabilities provided by 3GPP network functions for third party, internal exposure/re-exposure, AFs (e.g., AF 1260), edge computing or fog computing systems, etc. In such embodiments, the NEF 1252 may authenticate, authorize, or throttle the AFs. NEF 1252 may also translate information exchanged with the AF 1260 and information exchanged with internal network functions. For example, the NEF 1252 may translate between an AF-Service-Identifier and an internal 5GC information. NEF 1252 may also receive information from other NFs based on exposed capabilities of other NFs. This information may be stored at the NEF 1252 as structured data, or at a data storage NF using standardized interfaces. The stored information can then be re-exposed by the NEF 1252 to other NFs and AFs, or used for other purposes such as analytics. Additionally, the NEF 1252 may exhibit an Nnef service-based interface.

The NRF 1254 may support service discovery functions, receive NF discovery requests from NF instances, and provide the information of the discovered NF instances to the NF instances. NRF 1254 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1254 may exhibit the Nnrf service-based interface.

The PCF 1256 may provide policy rules to control plane functions to enforce them, and may also support unified policy framework to govern network behavior. The PCF 1256 may also implement a front end to access subscription information relevant for policy decisions in a UDR of the UDM 1258. In addition to communicating with functions over reference points as shown, the PCF 1256 exhibit an Npcf service-based interface.

The UDM 1258 may handle subscription-related information to support the network entities' handling of communication sessions, and may store subscription data of UE 1202. For example, subscription data may be communicated via an N8 reference point between the UDM 1258 and the AMF 1244. The UDM 1258 may include two parts, an application front end and a UDR. The UDR may store subscription data and policy data for the UDM 1258 and the PCF 1256, and/or structured data for exposure and application data (including PFDs for application detection, application request information for multiple UEs 1202) for the NEF 1252. The Nudr service-based interface may be exhibited by the UDR 221 to allow the UDM 1258, PCF 1256, and NEF 1252 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1258 may exhibit the Nudm service-based interface.

The AF 1260 may provide application influence on traffic routing, provide access to NEF, and interact with the policy framework for policy control.

In some embodiments, the 5GC 1240 may enable edge computing by selecting operator/3$^{rd}$ party services to be geographically close to a point that the UE 1202 is attached to the network. This may reduce latency and load on the network. To provide edge-computing implementations, the 5GC 1240 may select a UPF 1248 close to the UE 1202 and execute traffic steering from the UPF 1248 to data network 1236 via the N6 interface. This may be based on the UE subscription data, UE location, and information provided by the AF 1260. In this way, the AF 1260 may influence UPF (re)selection and traffic routing. Based on operator deployment, when AF 1260 is considered to be a trusted entity, the network operator may permit AF 1260 to interact directly with relevant NFs. Additionally, the AF 1260 may exhibit an Naf service-based interface.

The data network 1236 may represent various network operator services, Internet access, or third party services that may be provided by one or more servers including, for example, application/content server 1238.

FIG. 13 schematically illustrates a wireless network 1300 in accordance with various embodiments. The wireless network 1300 may include a UE 1302 in wireless communication with an AN 1304. The UE 1302 and AN 1304 may be similar to, and substantially interchangeable with, like-named components described elsewhere herein.

The UE 1302 may be communicatively coupled with the AN 1304 via connection 1306. The connection 1306 is illustrated as an air interface to enable communicative coupling, and can be consistent with cellular communications protocols such as an LTE protocol or a 5G NR protocol operating at mmWave or sub-6 GHz frequencies.

The UE 1302 may include a host platform 1308 coupled with a modem platform 1310. The host platform 1308 may include application processing circuitry 1312, which may be coupled with protocol processing circuitry 1314 of the modem platform 1310. The application processing circuitry 1312 may run various applications for the UE 1302 that source/sink application data. The application processing circuitry 1312 may further implement one or more layer operations to transmit/receive application data to/from a data network. These layer operations may include transport (for example UDP) and Internet (for example, IP) operations.

The protocol processing circuitry 1314 may implement one or more of layer operations to facilitate transmission or reception of data over the connection 1306. The layer operations implemented by the protocol processing circuitry 1314 may include, for example, MAC, RLC, PDCP, RRC and NAS operations.

The modem platform 1310 may further include digital baseband circuitry 1316 that may implement one or more layer operations that are "below" layer operations performed by the protocol processing circuitry 1314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1310 may further include transmit circuitry 1318, receive circuitry 1320, RF circuitry 1322, and RF front end (RFFE) 1324, which may include or connect to one or more antenna panels 1326. Briefly, the transmit circuitry 1318 may include a digital-to-analog converter, mixer, intermediate frequency (IF) components, etc.; the receive circuitry 1320 may include an analog-to-digital converter, mixer, IF components, etc.; the RF circuitry 1322 may include a low-noise amplifier, a power amplifier, power tracking components, etc.; RFFE 1324 may include filters (for example, surface/bulk acoustic wave filters), switches, antenna tuners, beamforming components (for example, phase-array antenna components), etc. The selection and arrangement of the components of the transmit circuitry 1318, receive circuitry 1320, RF circuitry 1322, RFFE 1324, and antenna panels 1326 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1314 may include one or more instances of control circuitry (not shown) to provide control functions for the transmit/receive components.

A UE reception may be established by and via the antenna panels 1326, RFFE 1324, RF circuitry 1322, receive circuitry 1320, digital baseband circuitry 1316, and protocol processing circuitry 1314. In some embodiments, the antenna panels 1326 may receive a transmission from the AN 1304 by receive-beamforming signals received by a plurality of antennas/antenna elements of the one or more antenna panels 1326.

A UE transmission may be established by and via the protocol processing circuitry 1314, digital baseband circuitry 1316, transmit circuitry 1318, RF circuitry 1322, RFFE 1324, and antenna panels 1326. In some embodiments, the transmit components of the UE 1304 may apply a spatial filter to the data to be transmitted to form a transmit beam emitted by the antenna elements of the antenna panels 1326.

Similar to the UE 1302, the AN 1304 may include a host platform 1328 coupled with a modem platform 1330. The host platform 1328 may include application processing circuitry 1332 coupled with protocol processing circuitry 1334 of the modem platform 1330. The modem platform may further include digital baseband circuitry 1336, transmit circuitry 1338, receive circuitry 1340, RF circuitry 1342, RFFE circuitry 1344, and antenna panels 1346. The components of the AN 1304 may be similar to and substantially interchangeable with like-named components of the UE 1302. In addition to performing data transmission/reception as described above, the components of the AN 1308 may perform various logical functions that include, for example, RNC functions such as radio bearer management, uplink and downlink dynamic radio resource management, and data packet scheduling.

Figure 14:
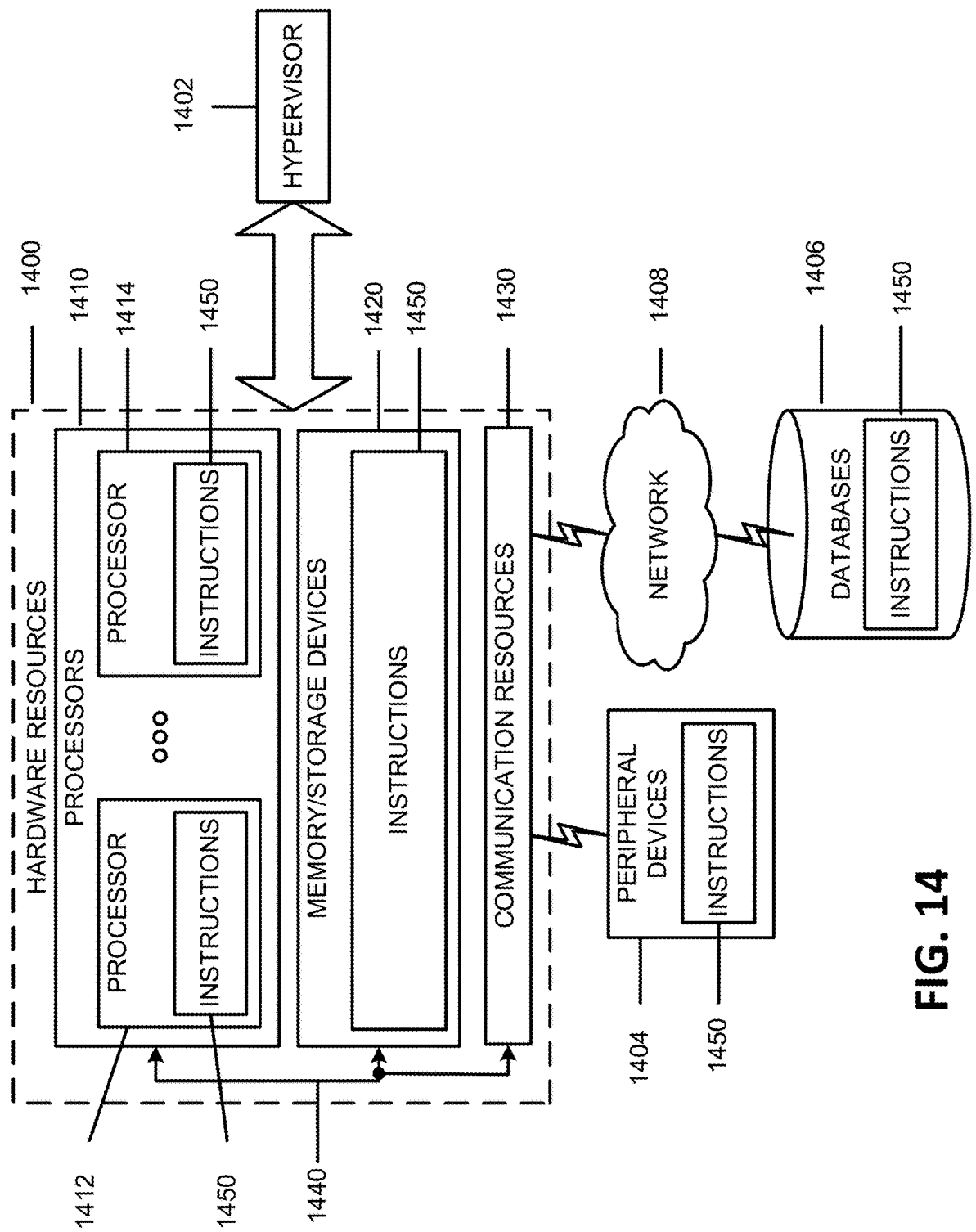
FIG. 14 depicts a block diagram illustrating components, according to some embodiments, able to read instructions from a machine-readable or computer-readable medium (e.g., a non-transitory machine-readable storage medium) and perform any one or more of the methodologies discussed herein.

FIG. 14 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1400 including one or more processors (or processor cores) 1410, one or more memory/storage devices 1420, and one or more communication resources 1430, each of which may be communicatively coupled via a bus 1440 or other interface circuitry. For embodiments where node virtualization (e.g., NFV) is utilized, a hypervisor 1402 may be executed to provide an execution environment for one or more network slices/subslices to utilize the hardware resources 1400.

The processors 1410 may include, for example, a processor 1412 and a processor 1414. The processors 1410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1420 may include main memory, disk storage, or any suitable combination thereof. The memory/storage devices 1420 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1430 may include interconnection or network interface controllers, components, or other suitable devices to communicate with one or more peripheral devices 1404 or one or more databases 1406 or other network elements via a network 1408. For example, the communication resources 1430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1450 may comprise software, a program, an application, an applet, an app, or other executable code for causing at least any of the processors 1410 to perform any one or more of the methodologies discussed herein. The instructions 1450 may reside, completely or partially, within at least one of the processors 1410 (e.g., within the processor's cache memory), the memory/storage devices 1420, or any suitable combination thereof. Furthermore, any portion of the instructions 1450 may be transferred to the hardware resources 1400 from any combination of the peripheral devices 1404 or the databases 1406. Accordingly, the memory of processors 1410, the memory/storage devices 1420, the peripheral devices 1404, and the databases 1406 are examples of computer-readable and machine-readable media.

In some embodiments, the electronic device(s), network(s), system(s), chip(s) or component(s), or portions or implementations thereof, of FIGS. 12-14, or some other figure herein, may be configured to perform one or more processes, techniques, or methods as described herein, or portions thereof. One such example of an operation flow/algorithmic structure is depicted in FIG. 15A, which may be performed by a next-generation NodeB (gNB) or portion thereof in some embodiments. In this example, operation flow/algorithmic structure 1500 may include, at 1505, retrieving configuration information from memory, wherein the configuration information includes an indication that a plurality of synchronization signal blocks (SSBs) are frequency division multiplexed (FDMed) over a common set of orthogonal frequency division multiplexing (OFDM) symbols, and an indication that each SSB in the plurality of SSBs has a common cell identifier. Operation flow/algorithmic structure 1500 may further include, at 1510, encoding a message for transmission to a user equipment (UE) that includes the configuration information.

Figure 15B:
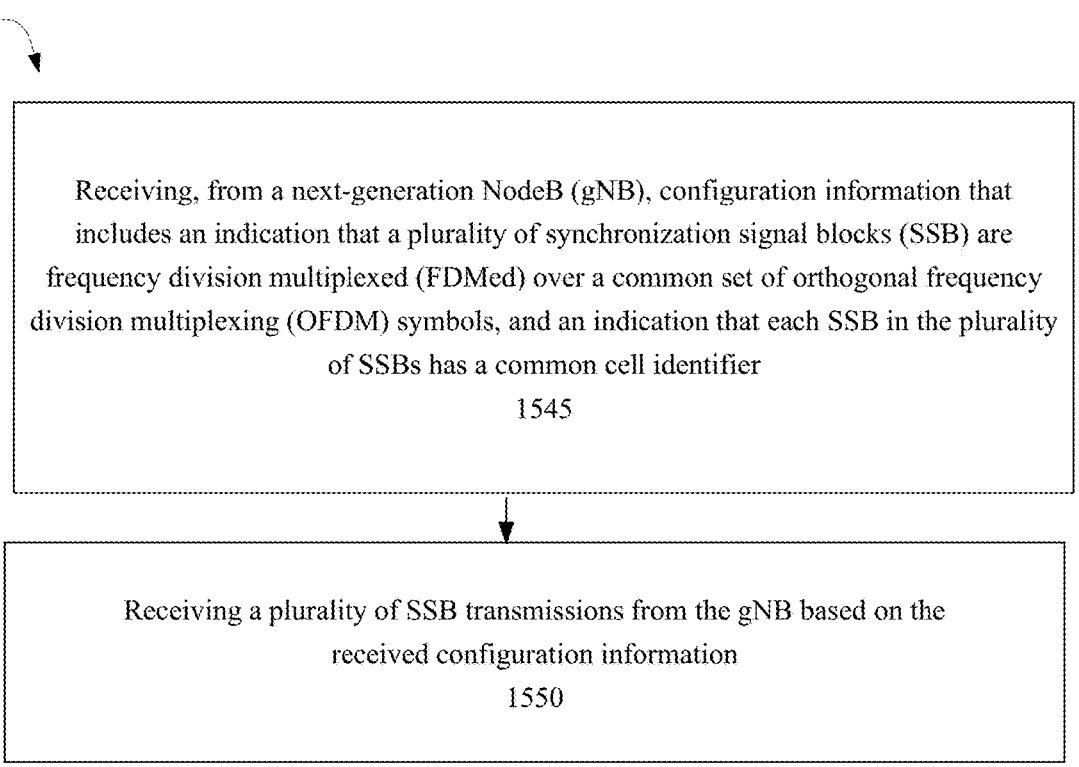

Another example of an operation flow/algorithmic structure is depicted in FIG. 15B, which may be performed by a UE or portion thereof in some embodiments. In this example, operation flow/algorithmic structure 1540 may include, at 1545, receiving, from a next-generation NodeB (gNB), configuration information that includes an indication that a plurality of synchronization signal blocks (SSB) are frequency division multiplexed (FDMed) over a common set of orthogonal frequency division multiplexing (OFDM) symbols, and an indication that each SSB in the plurality of SSBs has a common cell identifier. Operation flow/algorithmic structure 1540 may further include, at 1550, receiving a plurality of SSB transmissions from the gNB based on the received configuration information.

Figure 15C:
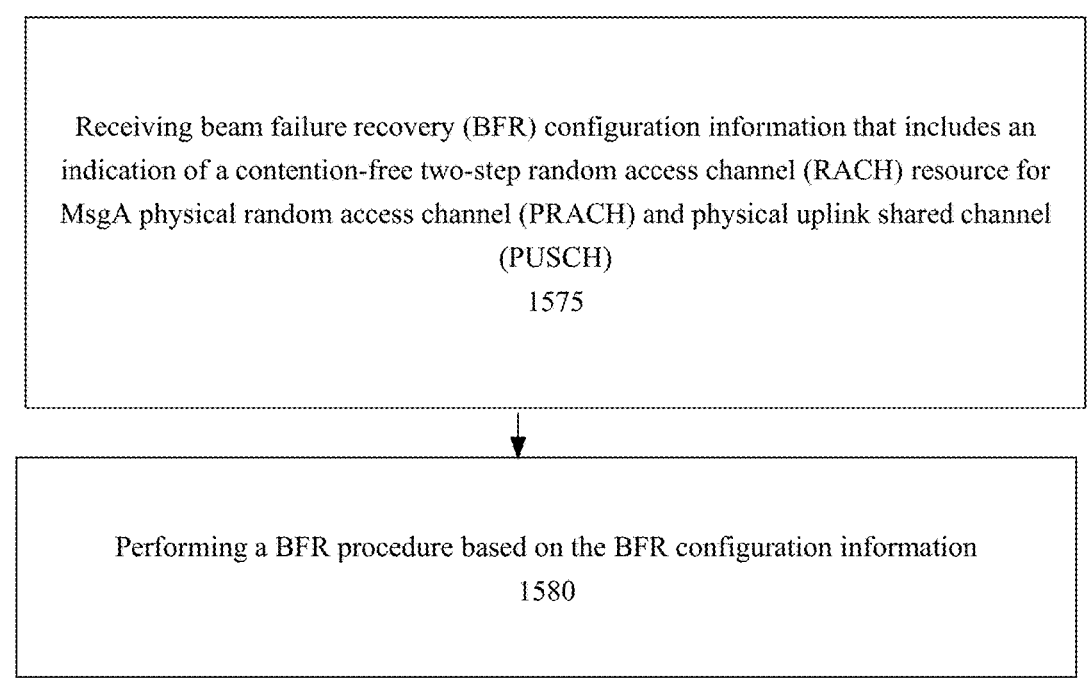

Another example of an operation flow/algorithmic structure is depicted in FIG. 15C, which may be performed by a user equipment (UE) or portion thereof in some embodiments. In this example, operation flow/algorithmic structure 1570 may include, at 1575, Receiving beam failure recovery (BFR) configuration information that includes an indication of a contention-free two-step random access channel (RACH) resource for MsgA physical random access channel (PRACH) and physical uplink shared channel (PUSCH). Operation flow/algorithmic structure 1570 may further include, at 1580, Performing a BFR procedure based on the BFR configuration information.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a gNode B (gNB) having circuitry to provide multi-beam operation.

Example 1.1 may include the gNB of example 1, wherein the circuitry comprises: a plurality of antenna panels; and processing circuitry to cause the plurality of antenna panels to transmit a plurality of Tx beams simultaneously to a UE.

Example 2 may include a method of performing a multi-beam operation with a gNB.

Example 2.1 may include the method of example 2 or some other example herein, further comprising: configuring a plurality of SSBs that are FDMed over a same OFDM symbol, e.g. SSBs occupy different frequency resources in the same OFDM symbol.

Example 2.1.1 may include the method of example 2.1 or some other example herein, further comprising configuring the plurality of SSBs with a same cell ID (this may cause the UE to treat the FDMed SSBs as being from the same cell).

Example 2.1.2 may include the method of example 2.1 or some other example herein, further comprising: mapping the FDMed SSBs to a same antenna port or different antenna ports.

Example 2.1.3 may include the method of example 2.1 or some other example herein, wherein on a same frequency position, an SSB index is sequentially numbered in an ascending order within one SS Burst Set Period.

Example 2.1.3.1 may include the method of example 2.1.3 or some other example herein, wherein the SSB with the same index recurring with the SSB periodicity is QCLed.

Example 2.1.3.2 may include the method of example 2.1.3 or some other example herein, further comprising: configuring, with an RRC information element, CSI-SSB-ResourceSet, the SSBs over the same OFDM symbols.

Example 2.1.3.2.1 may include the method of example 2.1.3.2 or some other example herein, wherein said configuring comprises generating the RRC information element and sending the RRC information element to the UE for beam management.

Example 2.1.3 may include the method of example 2.1 or some other example herein, wherein a value range of SSB index is to larger than 64 to, for example, support FDMed SSBs.

Example 2.1.4 may include the method of example 2.1 or some other example herein, further comprising: encoding PBCH content or PBCH DMRS sequences to carry SSB index information.

Example 2.1.5 may include the method of example 2.1 or some other example herein, further comprising encoding an SIB (e.g., SIB1) to provide an SSB pattern in frequency domain, e.g. how many SSBs are transmitted in FDMed manner and a frequency position of each SSB.

Example 2.1.5.1 may include the method of example 2.1.5 or some other example herein, wherein the SIB includes an RRC parameter, for example, ssb-FDMed, to indicate a number of FDMed SSBs over a same OFDM symbol, or ssb-FrequencyPosition to indicate an SSB position in frequency domain.

Example 2.1.6 may include the method of example 2.1 or some other example herein, wherein the SSB position in frequency is delivered to the UE when the gNB configures the UE with SSB indexes for beam management in the RRC information element CSI-SSB-ResourceSet.

Example 2.1.6.1 may include the method of example 2.1.6 or some other example herein, wherein a parameter ssbFrequency provides information on a frequency position of configured SSBs.

Example 2.1.7 may include the method of example 2.1 or some other example herein, further comprising transmitting multiple Tx beams over SSB from multiple panels, wherein the SSBs are sent over a same time and frequency resources.

Example 2.1.7.1 may include the method of example 2.1.7 or some other example herein, wherein the SSBs from different Tx beams are with the same content (for example, PSS/SSS and PBCH are the same). From the UE perspective, it can be viewed as a composite of multiple Tx beams. For example, the same SSB are delivered with 4 Tx beams, and the UE treats it as a wider beam which is a composite of 4 Tx beams.

Example 2.1.7.2 may include the method of example 2.1.7 or some other example herein, wherein when the gNB sends multiple Tx beams for SSB over the same time and frequency resources, the content of the SSB are different to identify Tx beams. The Tx beam could be identified by PBCH content and/or PBCH DMRS sequences.

Example 2.1.8 may include the method of example 2.1 or some other example herein, wherein when multiple SSBs are multiplexed in an FDM manner in a same symbol, ssb-PositionInFrequency may also be configured in SIB1 and/or ServingCellConfigCommon, and can be used to indicate the frequency locations of multiple SSB transmission in a same symbol. This can allow UE to perform rate-matching of PDSCH around the SSB in time and frequency domain.

Example 2.1.9 may include the method of example 2.1 or some other example herein, wherein a frequency location of multiple SSBs can be derived from the detected SSB and the number of SSBs in a same symbol. In one example, the frequency gap between different SSB transmissions can be predefined in the specification or configured by higher layers via minimum system information (MSI), remaining minimum system information (RMSI), other system information (OSI) or determined in accordance with the system bandwidth. Based on this, UE can derive the frequency location of different SSBs in the system bandwidth and perform rate-matching or PDSCH accordingly.

Example 2.1.10 may include the method of example 2.1 or some other example herein, wherein for FDMed SSBs, one SSB could have different index at physical layer and RRC layer. And a mapping between the physical layer SSB index and the RRC layer SSB index could be introduced.

Example 2.1.10.1 may include the method of example 2.1.10 or some other example herein, wherein FDMed SSBs are configured with a same cell ID and a UE may treat the FDMes SSBs as being from a same cell. Over the same OFDM symbol, the FDMed SSBs may also be configured with a same physical layer SSB index $SSB_{PHY}$, which ranges from 0 to 63 and is indicated by 6 bits.

Example 2.1.10.1.2 may include the method of example 2.1.10.1 or some other example herein, wherein a UE could obtain the physical layer SSB index using the same processing as Rel-15.

Example 2.1.10.2 may include the method of example 2.1.10.1 or some other example herein, wherein, at an RRC layer, a logical SSB index $SSB_{RRC}$ is defined.

Example 2.1.10.2.1 may include the method of example 2.1.10.2, wherein $SSB_{RRC}$ is e derived as: $SSB_{RRC}=SSB_{PHY}+I_{freq}\times(SSB_{max,PHY}+1)$, where $SSB_{max,PHY}$ is a maximum value of the physical layer SSB index, for example, 63. $I_{freq}$ is the index of SSB position in frequency domain. For example, if 4 SSBs are FDMed in the same OFDM symbol, then $I_{freq}$ is ranging from 0 to 3.

Example 2.1.10.3 may include the method of any one of examples 2.1.10-2.1.10.2.1 or some other example herein, wherein in the RRC information element CSI-SSB-ResourceSet, the gNB configures SSBs with the RRC layer SSB indexes ($SSB_{RRC}$) to the UE for beam management purpose. In System Information Block (SIB), for example, SIB1, the gNB should send information on how many SSBs are transmitted in FDMed manner and the frequency position of each SSB. New RRC parameters could be introduced to SIB1, for example, ssb-FDMed to indicate the number of FDMed SSBs over the same OFDM symbols, and ssb-FrequencyPosition to indicate the SSB position in frequency domain. Alternatively, SSB frequency information could be sent to the UE in CSI-SSB-ResourceSet, including the number of FDMed SSBs and the frequency position of each configured SSB index.

Example 2.1.10.4 may include the method of examples 2.1.10-2.1.10.3 or some other example herein, wherein the SSB with the same physical layer SSB index and with the same frequency position recurring with the SSB periodicity is QCLed. In other words, the SSB with the same RRC layer SSB index recurring with the SSB periodicity is QCLed.

Example 2.3 may include a method of operating a UE, the method comprising: receiving configuration information to configure a plurality of SSBs that are to be FDMed over a same OFDM symbol; and receiving one or more of the plurality of SSBs.

Example A1 may include a method of wireless communication for a fifth generation (5G) or new radio (NR) system, comprising: detecting, by a UE, a newly identified candidate gNB transmit (Tx) beam; carrying, by the UE, information of multiple new candidate Tx beams on a physical uplink shared channel (PUSCH); and transmitting, by the UE, a MsgA physical random access channel (PRACH) and a PUSCH in 2-step random access (RACH) procedure in accordance with the newly identified candidate gNB Tx beam.

Example A2 may include the method of example A1 or some other example herein, wherein more than one physical random access channel (PRACH) configuration including different PRACH formats may be configured for a UE by higher layers via minimum system information (MSI), remaining minimum system information (RMSI), other system information (OSI) or dedicated radio resource control (RRC) signaling.

Example A3 may include the method of example A2 or some other example herein, wherein a first PRACH configuration may be used for normal procedure for 4-step or 2-step RACH, while a second PRACH configuration may be used for beam failure recovery (BFR).

Example A4 may include the method of example A2 or some other example herein, wherein a first PRACH configuration including a first PRACH format and a second PRACH configuration including a second PRACH format may be multiplexed in a time division multiplexing (TDM) or frequency division multiplexing (FDM) manner.

Example A5 may include the method of example A1 or some other example herein, wherein contention free 2-step RACH resource for MsgA PRACH and PUSCH may be configured for a UE for BFR; wherein MsgA PRACH and PUSCH could be used to transmit the beam failure recovery request.

Example A6 may include the method of example A5 or some other example herein, wherein In the MsgA PUSCH, the information of multiple new candidate Tx beams could be reported.

Example A7 may include the method of example A5 or some other example herein, wherein the information of multiple new candidate beams may include the gNB Tx beam index, component carrier (CC) index and bandwidth part (BWP) index and/or beam quality, e.g. Layer 1-reference signal received power (L1-RSRP) and/or Layer 1-signal to interference and noise ratio (L1-SINR).

Example A8 may include the method of example A5 or some other example herein, wherein when gNB sends the beam failure recovery response over the dedicated CORE-SET/Search Space, the same beam as the one associated with beam failure recovery request transmission should be used.

Example A9 may include the method of example A5 or some other example herein, wherein the multiple Tx beams are reported in descending or ascending order of beam quality, e.g. the first Tx beam is the strongest or weakest, respectively. In this case, the L1-RSRP/L1-SINR could be optional.

Example A10 may include the method of example A1 or some other example herein, wherein when sending beam failure recovery request over MsgA PRACH and PUSCH, the beam failure recovery request could be transmitted with beam sweeping if multiple gNB Tx beams are identified.

Example A11 may include the method of example A1 or some other example herein, wherein a default beam should be applied for the gNB to send the beam failure recovery response and for the UE to monitor the response; wherein the default beam can be defined as the strongest beam/the first beam contained in the beam reporting carried by MsgA PUSCH.

Example A12 may include the method of example A1 or some other example herein, wherein a dedicated scheduling request (SR) resource may be configured for BFR for a given UE.

Example A13 may include the method of example A1 or some other example herein, wherein SSB indexes are mapped to valid SR resource in the following order: first, in increasing order of cyclic shift indexes within a single SR resource; second, in increasing order of frequency resource indexes for frequency multiplexed SR resources; third, in increasing order of time resource indexes for time multiplexed SR resources within a slot; fourth, in increasing order of indexes for slots.

Example A14 may include the method of example A1 or some other example herein, wherein PRACH and/or PUCCH resource can be configured for SCell, which may be used for BFR of SCell and/or PCell.

Example A15 is a method for implementing a UE, the method comprising: detecting a candidate transmit (Tx) beam from a gNB; and encoding a signal for transmission to the gNB, the signal including a MsgA PRACH according to the candidate Tx beam.

Example A1b may include the method of example A15, or of any other example herein, further comprising transmitting the encoded signal to the gNB.

Example A11 may include the method of example A15, or of any other example herein, wherein the signal is based on one more PRACH configurations.

Example A1b may include the method of example A17, or of any other example herein, wherein the one more PRACH configurations include PRACH formats configured by higher layers.

Example A19 may include the method of example A18, or of any other example herein, wherein configured by higher layers further includes configured by higher layers via minimum system information (MSI), remaining minimum system information (RMSI), other system information (OSI) or dedicated radio resource control (RRC) signaling.

Example A20 may include the method of example A17, or of any other example herein, wherein first PRACH configuration is used for normal procedure 4-step or 2-step RACH, and a second PRACH configuration is used for beam failure recovery (BFR).

Example A21 may include the method of example A20, or of any other example herein, wherein the a format of the second PRACH is multiplexed in TDM or in FDM.

Example A22 may include the method of example A20, or of any other example herein, wherein MsgA PRACH and PUSCH are used to transmit a beam failure recovery request.

Example A23 may include the method of example A15-A22 or some other example herein, further comprising: determining information for multiple candidate Tx beams; and encoding a PUSCH for transmission in the MsgA, wherein the PUSCH includes the information.

Example X1 includes an apparatus comprising: memory to store configuration information; and processor circuitry, coupled with the memory, to: retrieve the configuration information from the memory, wherein the configuration information includes an indication that a plurality of synchronization signal blocks (SSBs) are frequency division multiplexed (FDMed) over a common set of orthogonal frequency division multiplexing (OFDM) symbols, and an indication that each SSB in the plurality of SSBs has a common cell identifier; and encode a message for transmission to a user equipment (UE) that includes the configuration information.

Example X2 includes the apparatus of example X1 or some other example herein, wherein the message is encoded for transmission via radio resource control (RRC) signaling.

Example X3 includes the apparatus of example X1 or some other example herein, wherein: the plurality of SSBs are mapped to a common antenna port of a next-generation NodeB (gNB), or at least two of the plurality of SSBs are mapped to different antenna ports of the gNB.

Example X4 includes the apparatus of example X1 or some other example herein, wherein the configuration information includes an SSB index sequentially numbered in an ascending order within one synchronization signal (SS) burst set period.

Example X5 includes the apparatus of example X4 or some other example herein, wherein the SSB index has a range of 0 to 255 or 0 to 128.

Example X6 includes the apparatus of example X1 or some other example herein, wherein the processing circuitry is further to encode a plurality of SSB messages for transmission via multiple transmission beams from multiple panels of a gNB.

Example X7 includes the apparatus of example X6 or some other example herein, wherein the multiple transmission beams utilize common time and frequency resources.

Example X8 includes the apparatus of example X6 or some other example herein, wherein the plurality of SSB messages include common content.

Example X9 includes one or more non-transitory computer-readable media storing instructions that, when executed by one or more processors, are to cause a user equipment (UE) to: receive, from a next-generation NodeB (gNB) configuration information that includes an indication that a plurality of synchronization signal blocks (SSB) are frequency division multiplexed (FDMed) over a common set of orthogonal frequency division multiplexing (OFDM) symbols, and an indication that each SSB in the plurality of SSBs has a common cell identifier; and receive a plurality of SSB transmissions from the gNB based on the received configuration information.

Example X10 includes the one or more non-transitory computer-readable media of example X9 or some other example herein, wherein the configuration information is received via radio resource control (RRC) signaling.

Example X11 includes the one or more non-transitory computer-readable media of example X9 or some other example herein, wherein the plurality of SSBs are mapped to a common antenna port of the gNB, or at least two of the plurality of SSBs are mapped to different antenna ports of the gNB.

Example X12 includes the one or more non-transitory computer-readable media of example X9 or some other example herein, wherein the configuration information includes an SSB index sequentially numbered in an ascending order within one SS burst set period, the SSB index having a range of 0 to 255 or 0 to 128.

Example X13 includes the one or more non-transitory computer-readable media of example X9 or some other example herein, wherein the plurality of SSB transmissions are received via multiple transmission beams from multiple panels of the gNB.

Example X14 includes the one or more non-transitory computer-readable media of example X13 or some other example herein, wherein the multiple transmission beams utilize common time and frequency resources.

Example X15 includes the one or more non-transitory computer-readable media of example X13 or some other example herein, wherein the plurality of SSB transmissions include common content.

Example X16 includes one or more non-transitory computer-readable media storing instructions that, when executed by one or more processors, are to cause a user equipment (UE) to: receive beam failure recovery (BFR) configuration information that includes an indication of a contention-free two-step random access channel (RACH) resource for MsgA physical random access channel (PRACH) and physical uplink shared channel (PUSCH); and perform a BFR procedure based on the BFR configuration information.

Example X17 includes the one or more non-transitory computer-readable media of example X16 or some other example herein, wherein the BFR configuration information is received via minimum system information (MSI), remaining minimum system information (RMSI), other system information (OSI) or dedicated radio resource control (RRC) signaling.

Example X18 includes the one or more non-transitory computer-readable media of example X16 or some other example herein, wherein the media further stores instructions for causing the UE to send a beam failure recovery request over MsgA PRACH and PUSCH.

Example X19 includes the one or more non-transitory computer-readable media of example X16 or some other example herein, wherein performing the BFR procedure includes identifying one or more new candidate next-generation NodeB (gNB) transmission (Tx) beams having a quality that is higher than a threshold identified in the BFR configuration information.

Example X20 includes the one or more non-transitory computer-readable media of example X19 or some other example herein, wherein the UE sends the MsgA PRACH and PUSCH using a spatial relation associated with at least one of the identified one or more new candidate gNB Tx beams.

Example X21 includes the one or more non-transitory computer-readable media of example X19 or some other example herein, wherein the MsgA PUSCH includes information associated with the one or more new candidate gNB Tx beams.

Example X22 includes the one or more non-transitory computer-readable media of example X21 or some other example herein, wherein the information associated with the one or more new candidate gNB Tx beams includes an indication of a gNB Tx beam index, a component carrier (CC) index, a bandwidth part (BWP) index, or a beam quality indicator.

Example Z01 may include an apparatus comprising means to perform one or more elements of a method described in or related to any of examples 1-X21, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-X21, or any other method or process described herein.

Example Z03 may include an apparatus comprising logic, modules, or circuitry to perform one or more elements of a method described in or related to any of examples 1-X21, or any other method or process described herein.

Example Z04 may include a method, technique, or process as described in or related to any of examples 1-X21, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-X21, or portions thereof.

Example Z06 may include a signal as described in or related to any of examples 1-X21, or portions or parts thereof.

Example Z07 may include a datagram, packet, frame, segment, protocol data unit (PDU), or message as described in or related to any of examples 1-X21, or portions or parts thereof, or otherwise described in the present disclosure.

Example Z08 may include a signal encoded with data as described in or related to any of examples 1-X21, or portions or parts thereof, or otherwise described in the present disclosure.

Example Z09 may include a signal encoded with a datagram, packet, frame, segment, protocol data unit (PDU), or message as described in or related to any of examples 1-X21, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-X21, or portions thereof.

Example Z11 may include a computer program comprising instructions, wherein execution of the program by a processing element is to cause the processing element to carry out the method, techniques, or process as described in or related to any of examples 1-X21, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus comprising:
  memory to store configuration information related to a plurality of synchronization signal blocks (SSBs) that have a common cell identifier and that are to be frequency division multiplexed (FDMed) over a common set of orthogonal frequency division multiplexing (OFDM) symbols, wherein the configuration information includes:
    an indication that at least a portion of a first SSB of the plurality of SSBs is to be transmitted by a first antenna of a gNodeB (gNB) on a first frequency resource of an OFDM symbol of the common set of OFDM symbols; and
    an indication that at least a portion of a second SSB of the plurality of SSBs is to be transmitted by a second antenna of the gNB on a second frequency resource of the OFDM symbol; and
  processor circuitry coupled with the memory, the processor circuitry to encode a message for transmission to a user equipment (UE) that includes the configuration information.

2. The apparatus of claim 1, wherein the message is encoded for transmission via radio resource control (RRC) signaling.

3. The apparatus of claim 1, wherein the configuration information includes an SSB index sequentially numbered in an ascending order within one synchronization signal (SS) burst set period.

4. The apparatus of claim 3, wherein the SSB index has a range of 0 to 255 or 0 to 128.

5. The apparatus of claim 1, wherein the processor circuitry is further to encode a plurality of SSB messages for transmission via multiple transmission beams from multiple panels of a gNB.

6. The apparatus of claim 5, wherein the multiple transmission beams utilize common time and frequency resources.

7. The apparatus of claim 5, wherein the plurality of SSB messages includes common content.

8. One or more non-transitory computer-readable media storing instructions that, when executed by one or more processors, are to cause a user equipment (UE) to:
- identify, from a next-generation NodeB (gNB) configuration information related to a plurality of synchronization signal blocks (SSBs) that have a common cell identifier and that are to be frequency division multiplexed (FDMed) over a common set of orthogonal frequency division multiplexing (OFDM) symbols, wherein the configuration information includes:
  - an indication that at least a portion of a first SSB of the plurality of SSBs is to be transmitted by a first antenna of a gNodeB (gNB) on a first frequency resource of an OFDM symbol of the common set of OFDM symbols; and
  - an indication that at least a portion of a second SSB of the plurality of SSBs is to be transmitted by a second antenna of the gNB on a second frequency resource of the OFDM symbol; and
- identify a plurality of SSB transmissions from the gNB based on the configuration information.

9. The one or more non-transitory computer-readable media of claim 8, wherein the configuration information is received via radio resource control (RRC) signaling.

10. The one or more non-transitory computer-readable media of claim 8, wherein the configuration information includes an SSB index sequentially numbered in an ascending order within one synchronization signal (SS) burst set period, the SSB index having a range of 0 to 255 or 0 to 128.

11. The one or more non-transitory computer-readable media of claim 8, wherein the plurality of SSB transmissions are received via multiple transmission beams from multiple panels of the gNB.

12. The one or more non-transitory computer-readable media of claim 11, wherein the multiple transmission beams utilize common time and frequency resources.

13. The one or more non-transitory computer-readable media of claim 11, wherein the plurality of SSB transmissions includes common content.

14. An apparatus for use in a user equipment (UE), wherein the apparatus comprises:
- memory to store configuration information received from a next-generation NodeB (gNB), the configuration information related to a plurality of synchronization signal blocks (SSBs) that have a common cell identifier and that are to be frequency division multiplexed (FDMed) over a common set of orthogonal frequency division multiplexing (OFDM) symbols, wherein the configuration information includes:
  - an indication that at least a portion of a first SSB of the plurality of SSBs is to be transmitted by a first antenna of a gNB on a first frequency resource of an OFDM symbol of the common set of OFDM symbols; and
  - an indication that at least a portion of a second SSB of the plurality of SSBs is to be transmitted by a second antenna of the gNB on a second frequency resource of the OFDM symbol; and
- one or more processors configured to:
  - identify a plurality of SSB transmissions from the gNB based on the received configuration information.

15. The apparatus of claim 14, wherein the configuration information is received via radio resource control (RRC) signaling.

16. The apparatus of claim 14, wherein the configuration information includes an SSB index sequentially numbered in an ascending order within one synchronization signal (SS) burst set period, the SSB index having a range of 0 to 255 or 0 to 128.

17. The apparatus of claim 14, wherein the plurality of SSB transmissions are received via multiple transmission beams from multiple panels of the gNB.

18. The apparatus of claim 17, wherein the multiple transmission beams utilize common time and frequency resources.

19. The apparatus of claim 17, wherein the plurality of SSB transmissions includes common content.

* * * * *

UNITED STATES PATENT AND TRADEMARK OFFICE
CERTIFICATE OF CORRECTION

| | | |
|---|---|---|
| PATENT NO. | : 12,237,902 B2 | Page 1 of 1 |
| APPLICATION NO. | : 17/306550 | |
| DATED | : February 25, 2025 | |
| INVENTOR(S) | : Guotong Wang et al. | |

It is certified that error appears in the above-identified patent and that said Letters Patent is hereby corrected as shown below:

In the Claims

<u>Column 26</u>
Claim 1, Line 54, currently reads as "antenna of a gNodeB (gNB)" but should read as "antenna of a next-generation NodeB (gNB)"

<u>Column 27</u>
Claim 8, Line 27, currently reads as "antenna of a gNodeB (gNB)" but should read as "antenna of a gNB"

<u>Column 27</u>
Claim 8, Lines 34-35, indent the paragraphs to match Lines 18-23

Signed and Sealed this
Thirteenth Day of May, 2025

Coke Morgan Stewart
*Acting Director of the United States Patent and Trademark Office*